(12) United States Patent
Carlson et al.

(10) Patent No.: US 6,669,299 B2
(45) Date of Patent: Dec. 30, 2003

(54) FOLD-FLAT SEAT HINGE ASSEMBLY

(75) Inventors: Craig Carlson, Harper Woods, MI (US); David L. Robinson, Sterling Heights, MI (US); James V. Pospeshil, Harrison Township, MI (US); Alan D. Berg, Romeo, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/114,434

(22) Filed: Apr. 2, 2002

(65) Prior Publication Data

US 2002/0185904 A1 Dec. 12, 2002

Related U.S. Application Data

(63) Continuation-in-part of application No. 09/825,411, filed on Apr. 3, 2001, now Pat. No. 6,554,362.

(51) Int. Cl.[7] .................................................. B60N 2/20
(52) U.S. Cl. ............................ 297/378.14; 297/378.12
(58) Field of Search ..................... 297/378.1, 378.12, 297/378.13, 378.14, 367

(56) References Cited

U.S. PATENT DOCUMENTS

| | | | | |
|---|---|---|---|---|
| 3,736,026 A | * | 5/1973 | Ziegler et al. ......... | 297/378.14 |
| 4,219,234 A | | 8/1980 | Bell | |
| 4,579,387 A | | 4/1986 | Bell | |
| 4,747,641 A | * | 5/1988 | Bell ....................... | 297/378.11 |
| 4,919,482 A | * | 4/1990 | Landis et al. .......... | 297/378.11 |
| 5,718,481 A | * | 2/1998 | Robinson ............... | 297/367 |
| 5,938,286 A | * | 8/1999 | Jones et al. ............ | 297/378.12 |
| 6,161,899 A | | 12/2000 | Yu | |
| 6,511,129 B1 | * | 1/2003 | Minor et al. ........... | 297/367 |
| 6,513,875 B1 | * | 2/2003 | Gray et al. ............. | 297/378.14 |

* cited by examiner

Primary Examiner—Peter R. Brown
(74) Attorney, Agent, or Firm—Harness, Dickey & Pierce, P.L.C.

(57) ABSTRACT

A seat adjustment mechanism is provided and includes an arm defining a first locking shoulder, a sector plate rotatably supported by the arm and defining a second locking shoulder having a lock recess, a locking member selectively engaging at least one of the first and second locking shoulders, a quadrant rotatably supported by the arm and slidably supporting the locking member for locking the quadrant in one of a first and second position relative to the arm and a cam plate rotatably supported by the quadrant for selectively engaging the locking member for locking the quadrant in one of the first and second positions. In the first position the locking member is biased against the first locking shoulder and in the second position the locking member is biased into the lock recess. A gear assembly is preferably provided and operably supported by the quadrant for actuation of the cam plate.

24 Claims, 15 Drawing Sheets

FOLD-FLAT SEAT HINGE ASSEMBLY

CROSS-REFERENCE TO RELATED APPLICATIONS

This application is a continuation-in-part of U.S. patent application Ser. No. 09/825,411 filed on Apr. 3, 2001, now U.S. Pat. No. 6,544,362. The disclosure of the above application is incorporated herein by reference.

BACKGROUND OF THE INVENTION

1. Technical Field

The present invention relates generally to seat back adjustment mechanisms and more particularly to a seat back adjustment mechanism that enables a seat back to be locked in a forward fold-down position to remain substantially horizontal.

2. Discussion

Vehicle markets such as mini-van and sport utility are extremely competitive and a focus for improvement by automobile manufacturers. Specifically, automobile manufacturers seek to improve the overall utility and comfort of the vehicles in these markets in pursuit of attracting and keeping customers. One important feature is a flexible vehicle interior. Flexibility, in this sense, refers to the interior's ability to provide seating that may be modified to suit a particular customer's needs. For example, a customer might desire the removal of a rear seat to provide increased cargo space, while maintaining a middle seat or seats for additional passengers. Additionally, a passenger might desire the seat back of a front or middle seat to fold down, providing a work space while traveling. As such, a passenger could place a laptop computer on the folded down seat back or use the folded down seat back as a small desk for writing or reading.

As is known in the art, a seat back may be reclined to various recline positions providing occupant comfort. Concurrently, the seat back may be dumped to a fold forward position for providing improved access to a vehicle interior or a work space, as discussed above. Traditional seat back adjustment mechanisms retain a specific disadvantage in that the recline position of the seat back, prior to folding the seat back forward, defines the fold forward position of the seat back relative to horizontal. For example, if the seat back is in a fully reclined position prior to being folded forward, in the fold forward position the seat back will be at a substantial angle relative to horizontal. This is undesirable, particularly in the case of using the seat back as a work space.

It is therefore desirable in the industry to provide a fold-forward adjustment mechanism for use with a seat back that enables an operator to fold the seat back in a generally horizontal or fold-flat position regardless of the initial reclined position of the seat back relative to the seat.

SUMMARY OF THE INVENTION

Accordingly, the present invention provides a seat adjustment mechanism including an arm rotatably defining a first locking shoulder, a sector plate rotatably supported by the arm and defining a second locking shoulder having a lock recess, a locking member selectively engaging at least one of the first and second locking shoulders, a quadrant rotatably supported by the arm and slidably supporting the locking member for locking the quadrant in one of a first and second position relative to the arm and a cam plate rotatably supported by the quadrant for selectively engaging the locking member for locking the quadrant in one of the first and second positions. In the first position the locking member is biased against the first locking shoulder and in the second position the locking member is biased into the lock recess. A gear assembly is preferably provided and operably supported by the quadrant for actuation of the cam plate. The gear assembly preferably includes a first gear plate rotatably supported by the quadrant and a second gear plate in meshed engagement with the first gear plate and in operable communication with the cam plate for selectively imparting rotation of the cam plate.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
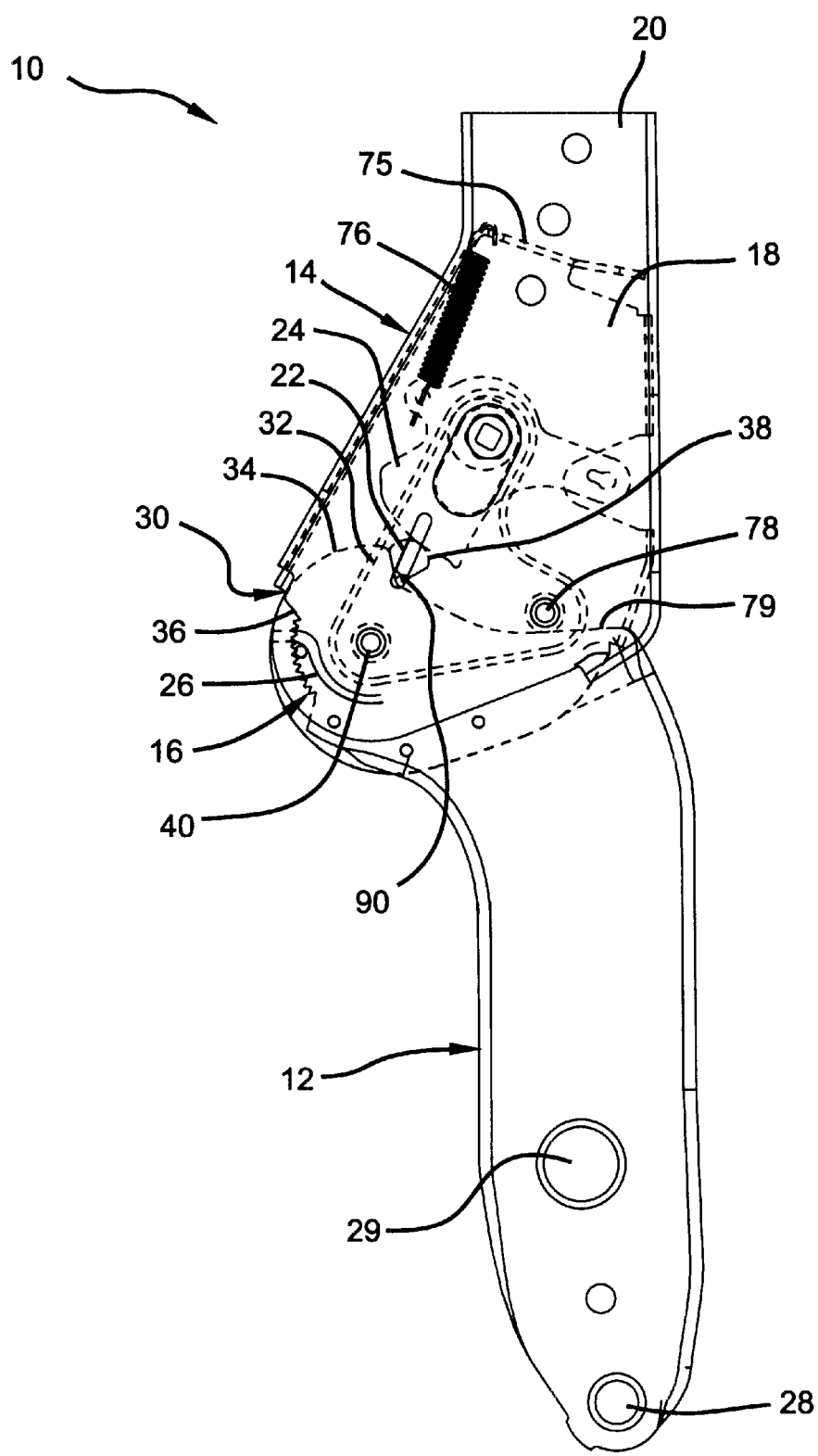
FIG. 1 is a side view of an adjustment mechanism according to the present invention.
Figure 2:
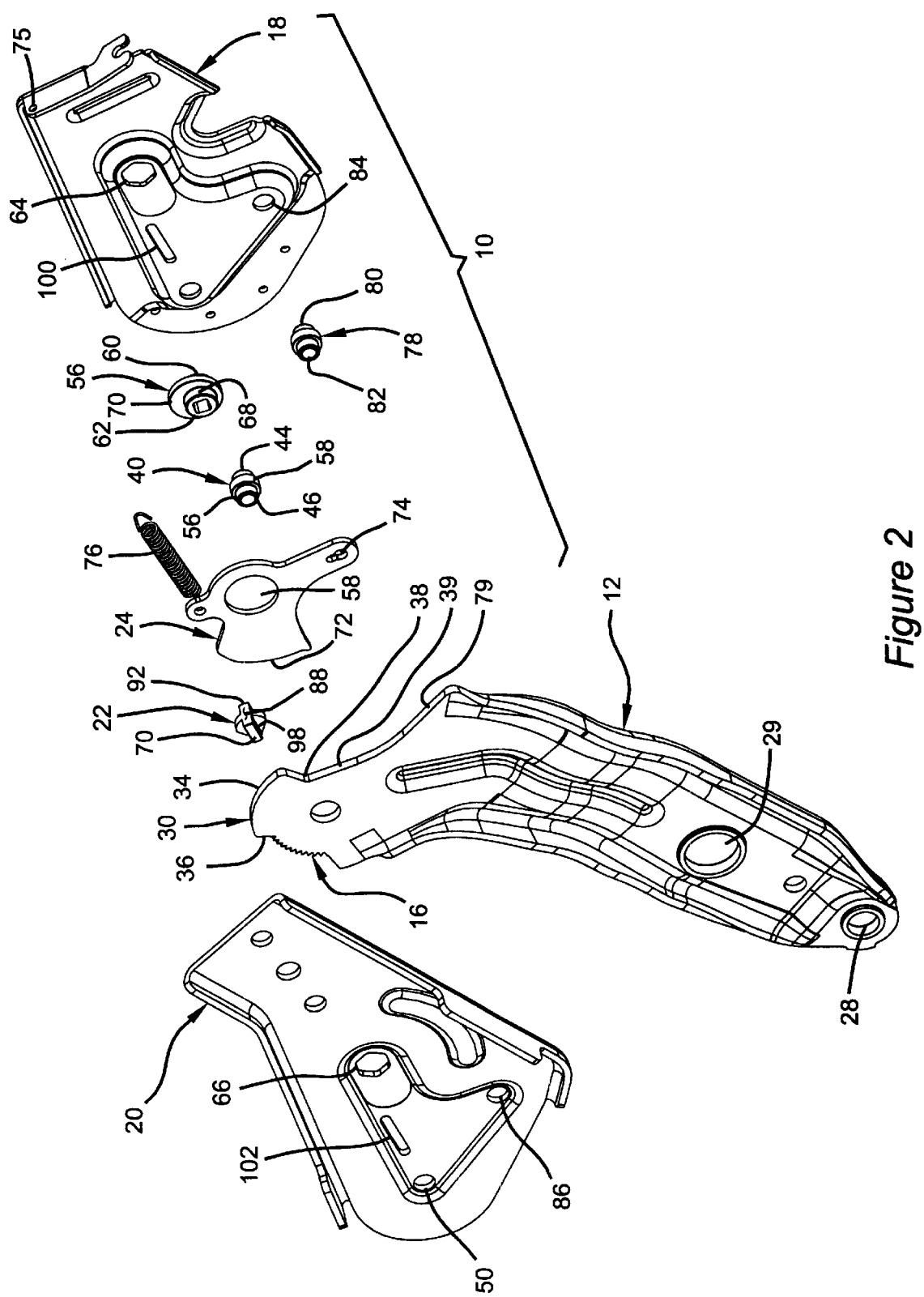
FIG. 2 is an exploded perspective view of the adjustment mechanism.

With particular reference to FIGS. 1 and 2, an adjustment mechanism 10 for use with a seat assembly is shown. The adjustment mechanism 10 generally includes an arm 12 disposed between and pivotally mounted relative to a quadrant 14 including inner and outer plates 18,20 and selectively locked relative to the quadrant 14 by a locking member 22. The locking member 22 is selectively engaged by a cam plate 24.

Figure 6A:
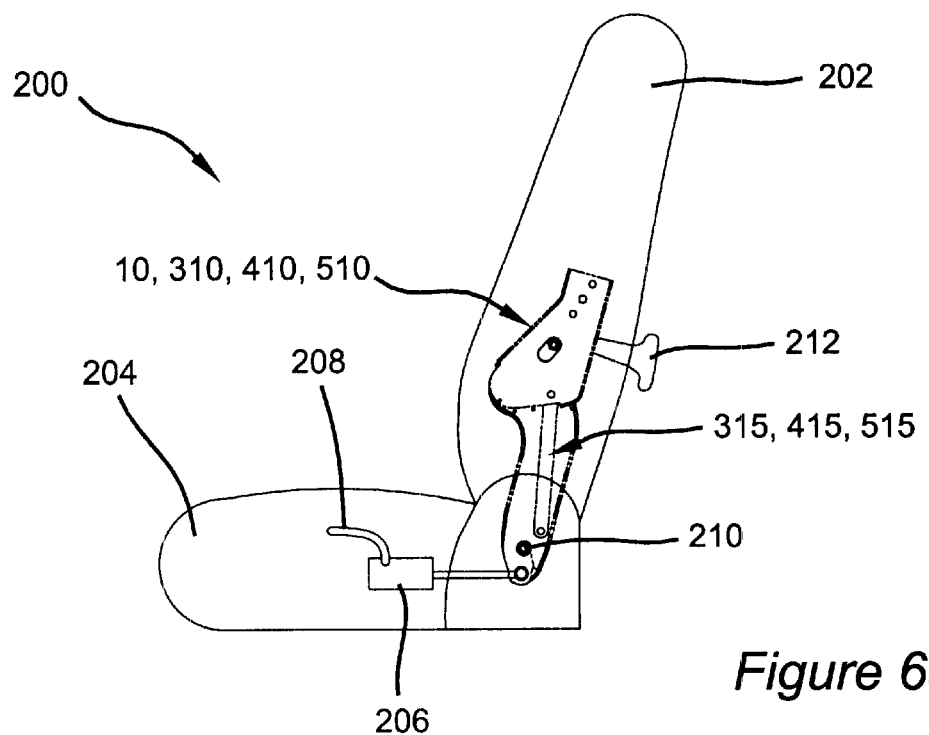
FIGS. 6a, 6b and 6c are side schematic views of a seat assembly including the adjustment mechanism of the present invention illustrating a seat back in various positions relative a seat.
Figure 6B:
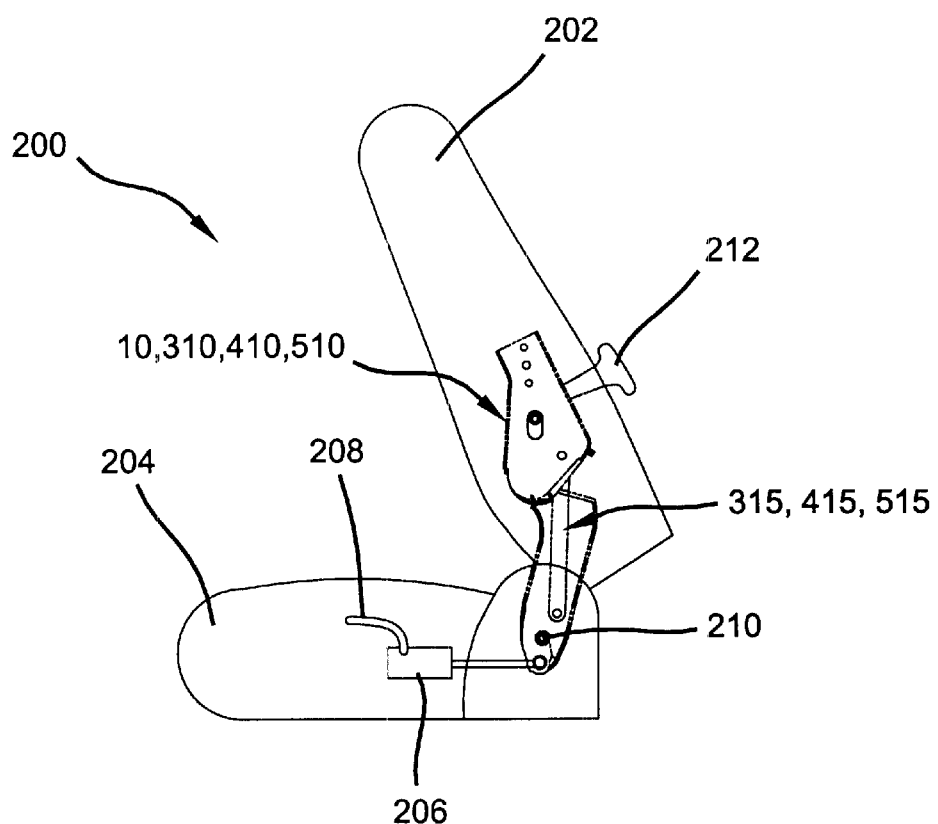
Figure 6C:
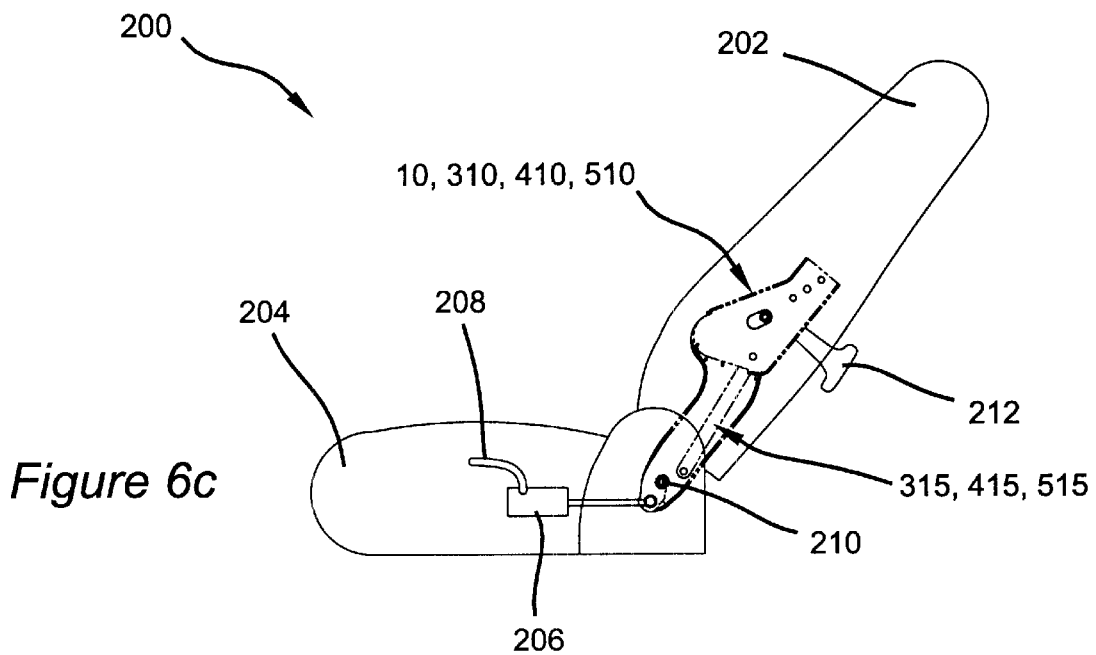

A first end of the arm 12 includes a portion 16 having a plurality of pawl teeth 26. A second end of arm 12 includes an aperture 28 for connecting to a linear recliner mechanism and an aperture 29 is included for providing a pivot axis for the adjustment mechanism 10 (see FIGS. 6a through 7). The first end of the arm 12 further includes a shoulder 30 having a first side surface 32, a top surface 34, and a second side surface 36. The first side surface 32 forms a corner 38 of the arm 12 at a junction with a top surface 39.

The arm 12 is disposed between and rotatably supports the inner and outer plates 18,20 on a first pivot 40. The first pivot 40 is received through an aperture 42 of the arm 12. The first pivot 40 includes first and second cylindrical extensions 44,46 that are receivable into and supported by first and second apertures 48,50, respectively. The first pivot 40 further includes a support bearing 52 that extends radially and is disposed between the first and second cylindrical extensions 44,46. The support bearing 52 includes a bearing surface 54 which is received into the aperture 42 for rotatably supporting the quadrant 14 relative to the arm 12.

The cam plate 24 is also disposed between the inner and outer plates 18,20 and is rotatably supported by a second pivot 56 received through a central aperture 58 of the cam plate 24. The second pivot 56 includes first and second cylindrical extensions 60,62 that are receivable into and supported by first and second apertures 64,66, respectively. The second pivot 56 also includes a support bearing 68 that extends radially and is disposed between the first and second cylindrical extensions 60,62. The support bearing 68 includes a bearing surface 70 which is received into the aperture 58 for rotatably supporting the cam plate 24.

One end of the cam plate 24 includes a cam surface 72. An opposite end of the cam plate 24 includes an aperture 74 for anchoring a first end of a spring 76 and the inner plate 18 includes an aperture 75 for anchoring a second end of the spring 76. The spring 76 rotationally biases the cam plate 24 in a first rotational direction, which biases the cam surface 72 toward the locking member 22, which, in turn, is forced toward the corner 38 and against the first side surface 32 of the arm 12. In this position, the quadrant 14 is held in a first upright position relative to the arm 12. A cross member 78 includes cylindrical extensions 80,82 received into apertures 84,86, respectively, of the inner and outer plates 18,20. The cross member 78 contacts a face 79 of the arm 12 for prohibiting reward rotation of the quadrant 14 relative to the arm 12.

The locking member 22 is a wedge-shaped member having a arcuate surface 88 at a wide end for engaging the cam surface 72 of the cam plate 24 and a notch 90 disposed in a narrow end. The notch 90 is adapted to engage the pawl teeth 26 of the arm 12 for locking the quadrant 14 relative the arm 12. Ribs 92,94 extend perpendicularly from faces 96,98 of the locking member 22. The ribs 92,94 are slidably supported within slots 100,102 of the inner and outer plates 18,20, respectively, enabling the locking member 22 to slide therebetween. The locking member 22 slides in the slots 100,102 as it interfaces between the arm 12 and the cam plate 24. The cam plate 24 acts on the arcuate surface 88 to bias the locking member 22 against the arm 12.

Figure 3:
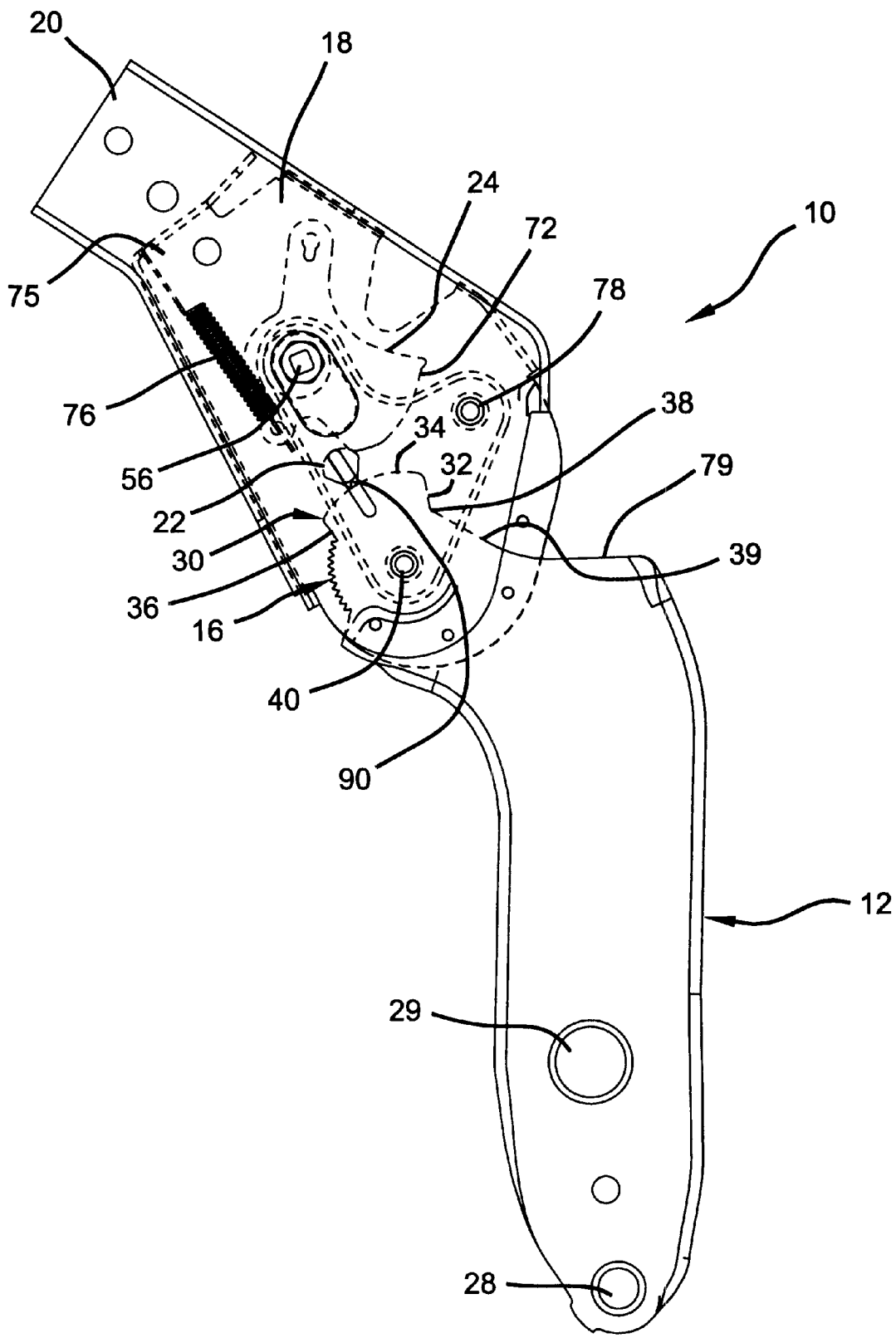
FIG. 3 is a side view illustrating the adjustment mechanism of FIGS. 1 and 2 in a first position.
Figure 4:
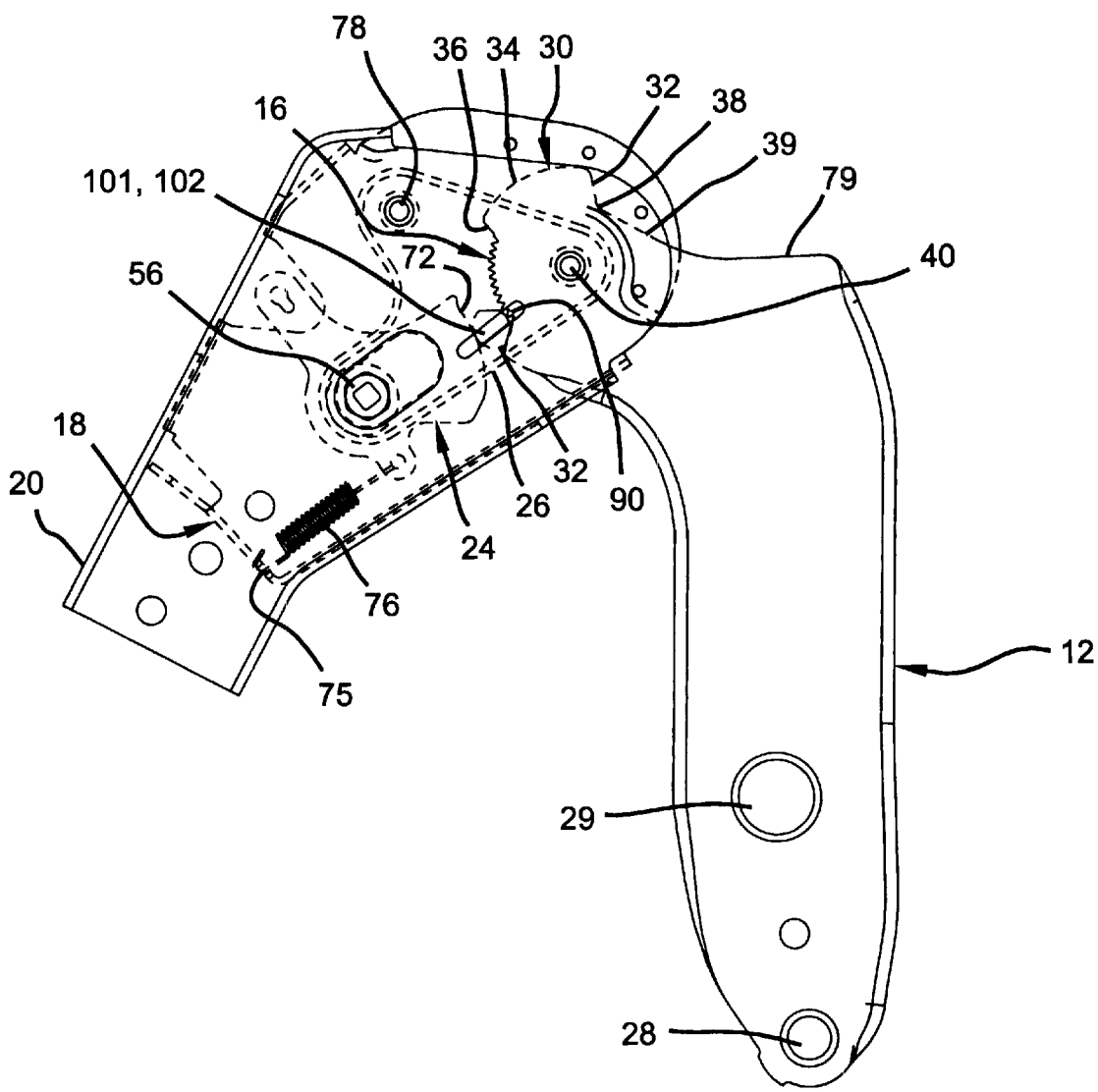
FIG. 4 is a side view illustrating the adjustment mechanism of FIGS. 1 and 2 in a second position.

With particular reference to FIGS. 1, 3 and 4, the operation of the adjustment mechanism 10 will be described in detail. In a first preferred embodiment, the adjustment mechanism 10 enables the quadrant 14 to pivot forward, relative to the arm 12, and lock in a plurality of forwardly inclined positions. To fold the quadrant 14 forward, the cam plate 24 is rotated against the biasing force of the spring 76, forcing the cam surface 72 to slide along and then move away from the arcuate surface 88 of the locking member 22. Thus, the ribs 92,94 of the locking member 22 are free to slide in the slots 100,102 of the inner and outer housing plates 18,20 as the locking member 22 moves from a recessed position adjacent to the first side surface 32 to a raised position on the top surface 38 of the shoulder 30. Specifically, as the cam plate 24 rotates against the bias of the spring 76, the locking member 22 is pinched between the first side surface 32 of arm 12 and the slots 100,102. As the cam surface 72 is moved out of blocking engagement with the locking member 22, upward movement of locking member 22 is unrestricted. As the quadrant 14 is rotated, the walls defining the slots 100,102 of the inner and outer housing plates 18,20 push the locking member 22 upward within slots 100,102 until the locking member 22 slides over onto the top surface 38. Continued forward rotation of the quadrant 14 causes the locking member 22 to slide along the top surface 38, as best seen in FIG. 3. Once the locking member 22 is on the top surface 38, the cam plate 24 may be released wherein the spring 76 again biases the cam plate 24 in the first rotational direction. The cam surface 72 again biases the locking member 22 within the slots 100,102 pushing the locking member 22 against the top surface 38.

Once the quadrant 14 has rotated sufficiently forward, the locking member 22 slides off of the top surface 38 and onto the pawl teeth portion 16. Due to the bias of the cam plate 24, the locking member 22 immediately engages the first pawl tooth 26, wherein the quadrant 14 is held in a first forward inclined position relative to the arm 12.

A plurality of alternative forward lock positions may be achieved by again operating the cam plate 24 to disengage the arcuate surface 88 of the locking member 22. Once disengaged, the locking member 22 is movable across the pawl teeth portion 16 until a desired position has been achieved. Upon achieving a desired position, the cam plate 24 is released, again biasing the locking member 22 into engagement with a particular tooth 26 of the pawl teeth portion 16.

To return the quadrant 14 to an upright position, relative to the arm 12, the cam plate 24 is again rotated against the biasing force of spring 76 to disengage the cam plate 24 from the locking member 22. As the quadrant 14 rotates rearwardly, the locking member 22 moves from a recessed position adjacent to the second side surface 36 to a raised position on the top surface 38 of the shoulder 30. Specifically, the locking member 22 is pinched between the second side surface 36 of the arm 12 and the slots 100,102 until the locking member 22 slides onto the top surface 38 of the arm 12. Once the locking member 22 is on the top surface 38, the cam plate 24 may be released wherein the spring 76 again biases the cam plate 24 in the first rotational direction. Thus, the cam surface 72 biases the locking member 22 within the slots 100,102 to force the locking member 22 against the top surface 38. After the quadrant 14 is rotated sufficiently rearward, the bias of the cam plate 24 causes the locking member 22 to slide within slots 100,102, toward the corner 38 and against first side surface 32, thereby locking the quadrant 14 in an upright position.

Figure 5:
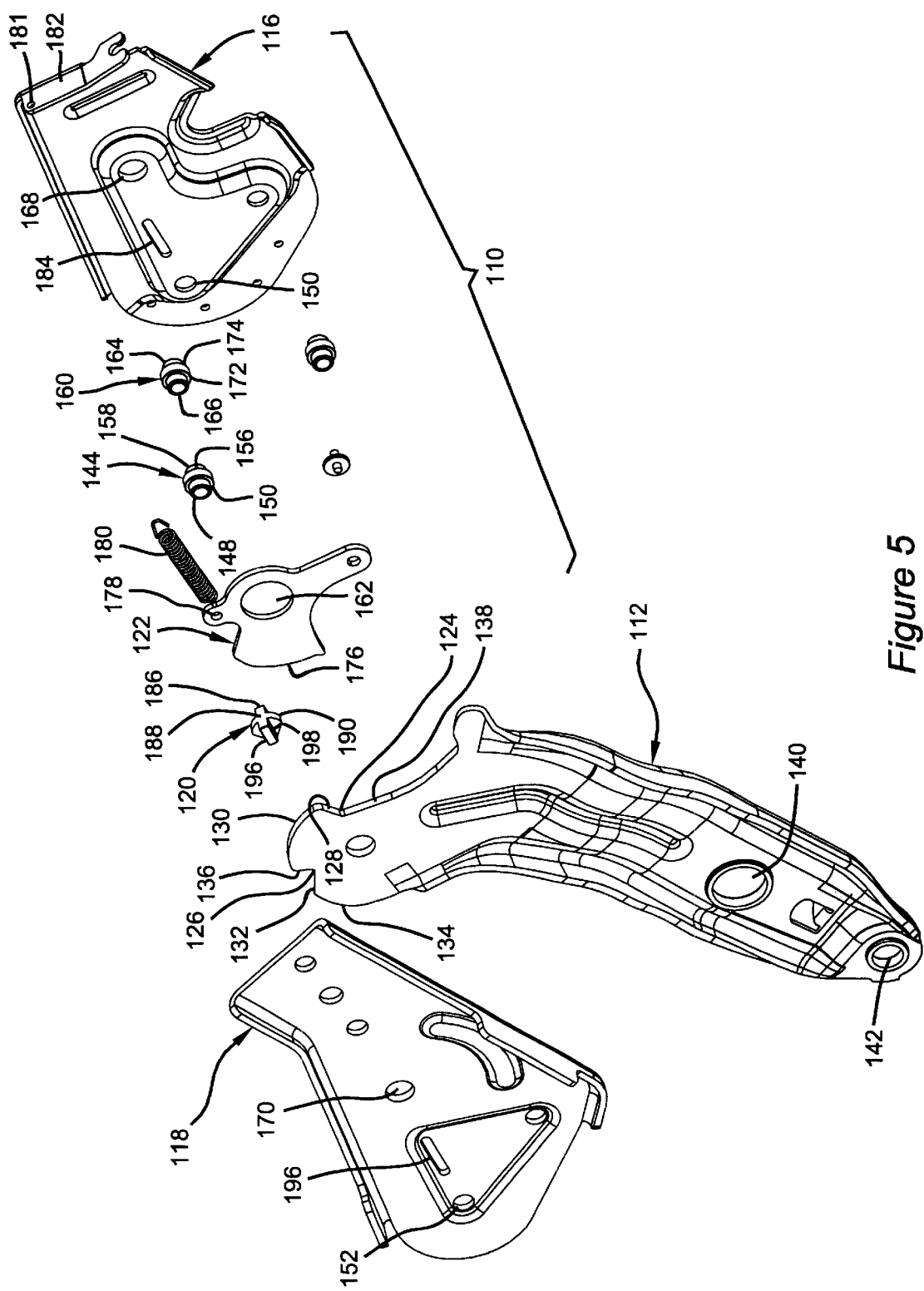
FIG. 5 is a exploded perspective view of a second embodiment of the adjustment mechanism of the present invention.

With reference to FIG. 5, a second preferred embodiment of the present invention is indicated as adjustment mechanism 110. The adjustment mechanism 110 generally includes an arm 112 disposed between and pivotally mounted to a quadrant 114 including inner and outer plates 116,118. The quadrant 114 is selectively locked relative to the arm 112 by a locking member 120 that is selectively engaged by a cam plate 122.

A first end of the arm 112 includes a first corner 124, a second corner 126, a first side surface 128, a first top surface 130, a second top surface 132, an arcuate surface 134, a second side surface 136, and a third top surface 138. The first corner 124 is formed at the intersection of the first side surface 128 and the third top surface 138. The second corner 126 is formed at the intersection of the second top surface 132 and the second side surface 136. A second end of the arm 112 includes a first aperture 140 for providing a pivot axis and a second aperture 142 for connecting to a linear recliner mechanism (see FIGS. 6a through 7). The arm 112 rotatably supports the inner and outer plates 116,118 on a first pivot 144.

The first pivot 144 includes first and second cylindrical extensions 146,148 that are received into and supported by apertures 150,152 in the inner and outer housing plates 116,118. The first pivot 144 also includes a radially extending support bearing 154 that includes a bearing surface 156. The first pivot 144 is received through an aperture 158 of the arm 112, whereby the first pivot 144 rotatably supports the quadrant 114 relative to the arm 112.

The cam plate 122 is also disposed between the inner and outer housing plates 116,118 and is rotatably supported therebetween by a second pivot 160 received through a central aperture 162 of the cam plate 122. The second pivot 160 includes first and second cylindrical extensions 164,166 that are received into and supported by apertures 168,170 in the inner and outer plates 116,118, respectively. The second pivot 160 also includes a radially extending support bearing 172 that includes a bearing surface 174. The second pivot 160 is received through the aperture 162 of the arm 112, whereby the second pivot 160 rotatably supports the quadrant 114 about the bearing surface 174.

One end of the cam plate 122 includes a cam surface 176 and an opposite end of the cam plate 122 includes an aperture 178 for anchoring a first end of a spring 180. The spring 180 is connected between the cam plate 122 and an aperture 181 formed through a tab 182. Tab 182 is formed along a top surface of the inner plate 116. The spring 180 rotationally biases the cam plate 122 in a first direction causing the cam surface 176 to bias the locking member 120 toward the first corner 124 and against first side surface 128 of the arm 112. When the locking member is in this position, the inner and outer plates 116,118 are held in a first upright position relative to the arm 112.

The locking member 120 interfaces between the arm 112 and the cam plate 122 and includes an arcuate surface 184 for engaging the cam surface 176 of the cam plate 122. The cam plate 122 acts on the arcuate surface 184 to bias the locking member 120 against the arm 112. Ribs 186,188 extend perpendicularly from respective faces 190,192 of the locking member 120. The ribs 186,188 are slidably supported within slots 194,196 of the inner and outer plates 116,118, enabling the locking member 120 to slide therebetween.

As previously described, the quadrant 114 can be folded forward relative to the arm 112 and locked in a single forwardly inclined position. To fold the quadrant 114 forward, the cam plate 122 is rotated in a second direction against the bias of the spring 180. As the cam plate 122 rotates in the second direction, the cam surface 176 slides along and then moves away from the arcuate surface 184 of the locking member 120, thus freeing the locking member 120 to slide in the slots 194,196 of the inner and outer plates 116,118 as it moves from a recessed position adjacent to the first side surface 128 to an outward position on the first top surface 130 of the arm 112. Specifically, as the cam plate 122 rotates against the bias of the spring 180, the locking member 120 is pinched between the first side surface 128 of the arm 112 and slots 194,196. As the cam surface 176 is moved from blocking the locking member 120, upward movement of the locking member 120 is unrestricted. The walls defining the slots 194,196 of the inner and outer plates 116,118 push the locking member 120 upwards within slots 194,196 until the locking member 120 slides over onto the first top surface 130 of the arm 112. Once the locking member 120 is on the first top surface 130, the cam plate 122 can be released so the spring 180 again biases the cam plate 122 in the first rotational direction, further biasing the locking member 120 against the first top surface 130.

After sufficient forward rotation of the quadrant 114, the locking member 120 slides off of the first top surface 130 and into the second corner 126. The locking member 120 is biased into engagement with the second corner 126 by the cam plate 122. The engagement of the locking member 120 and the second corner 126 holds the quadrant 114 in a forward position relative to the arm 112.

The quadrant 114 may be rotated further forward by again rotating the cam plate 122 against the bias of the spring 180, relieving engagement of the cam plate 122 and the locking member 120. The quadrant 114 rotates forward, pinching the locking member 120 between the slots 194,196 and the second top surface 132. Again, the walls defining the slots 194,196 push the locking member 120 upward within the slots 194,196 until locking member 120 slides over onto the arcuate surface 134. Once the locking member 120 is in contact with the arcuate surface 134, the cam plate 122 can again be released wherein the spring 180 biases the cam plate 122. As a result, the cam surface 176 again pushes the locking member 120 downward in the slots 194,196, biasing the locking member 120 against the arcuate surface 134. By rotating the quadrant 114 sufficiently backward, the locking member 120 can be again positioned within the second corner 126, locking the quadrant 114 in the first forward position.

The quadrant 114 may be rotated backward to the initial upright position by again operating the cam plate 122 against the bias of the spring 180, thus disengaging the cam plate 122 from the locking member 64. As the quadrant 114 rotates backward, the locking member 120 is pinched between the slots 194,196 and the second side surface 136, pushing the locking member 120 upward in the slots 194, 196 and over onto the first top surface 130. Upon sufficient backward rotation of the quadrant 114, the locking member 120 is pushed downward into engagement with the first corner 124 by the cam plate 122. Thus, the quadrant 114 is locked in the first upright position.

Figure 7:
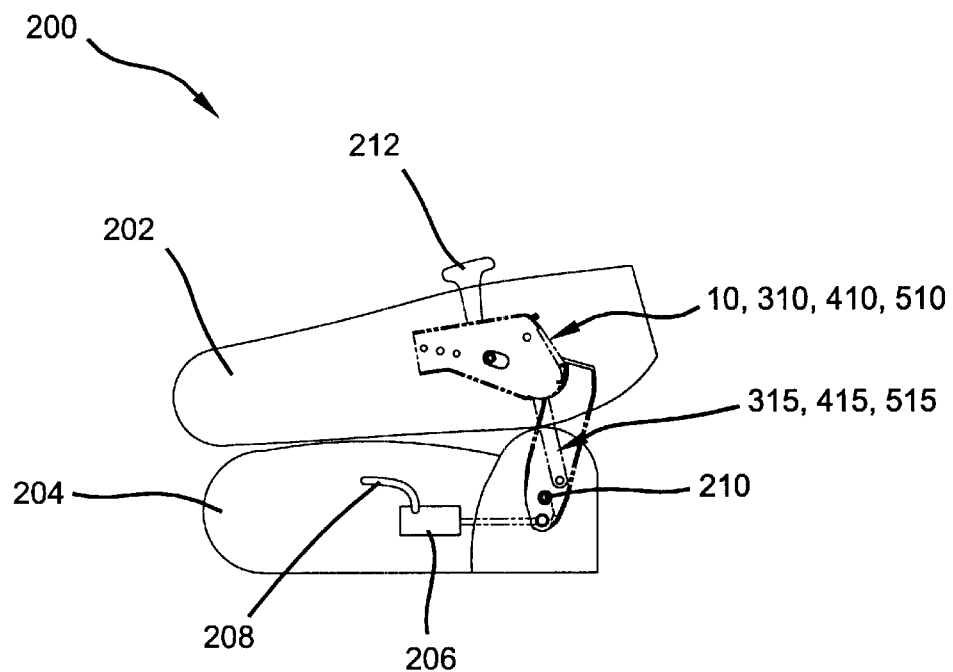
FIG. 7 is a side view of a seat assembly with a seat back in a forward-folded position relative a seat according to the present invention.

With reference to FIGS. 6a, 6b, 6c and 7, implementation of adjustment mechanism 10 in a seat assembly 200 is shown. The seat assembly 200 includes a seat back 202, a seat 204, the adjustment mechanism 10 and a linear recliner mechanism 206. The linear recliner mechanism 206 includes a handle 208 and is of a type commonly known in the art. The linear recliner mechanism 206 is operable to pivot the seat back 202 relative to seat 204 and to lock the seat back 202 in a plurality of reclined positions. The seat back 202 is shown in an upright position, a first reclined position and a second reclined position, in FIGS. 6a, 6b and 6c, respectively. As the seat back 202 reclines rearwardly, the adjustment mechanism 10 rotates about a pivot axis 210. The quadrant 14 of the adjustment mechanism 10 mount the seat back 202 to the seat 204 through the arm 12. The adjustment mechanism 10 is operable in any reclined position of seat back 202, by a handle 212, to fold the seat back 202 forward relative to the seat 204. FIG. 7 illustrates a fold-forward position of seat back 202 from the first reclined position shown in FIG. 6b. It should be noted, however, that while the adjustment mechanism 10 was used in the above description, the adjustment mechanism 110 may substitute in accordance with the invention.

Figure 8:
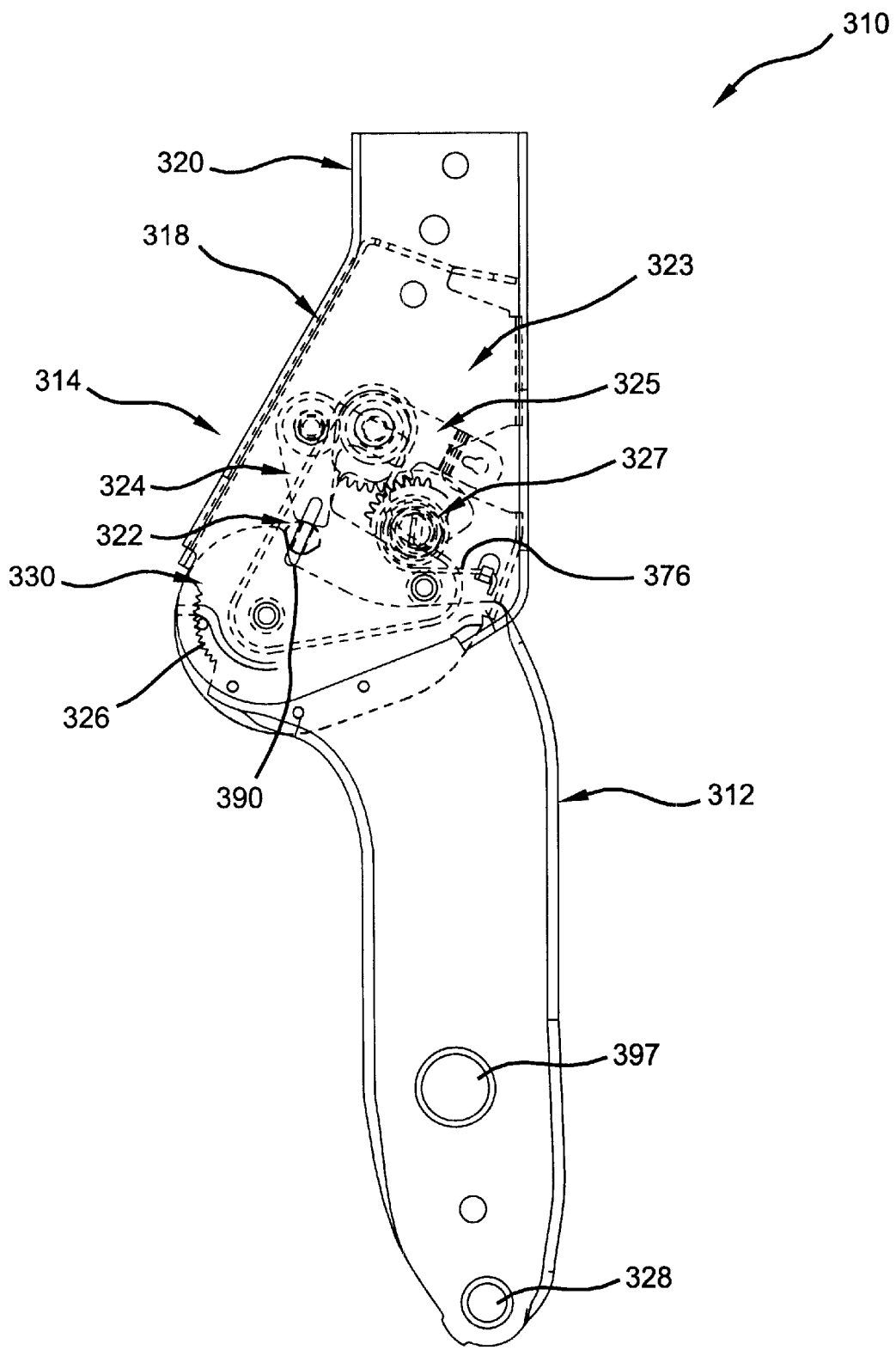
FIG. 8 is a side view of a third embodiment of the adjustment mechanism of the present invention.
Figure 9:
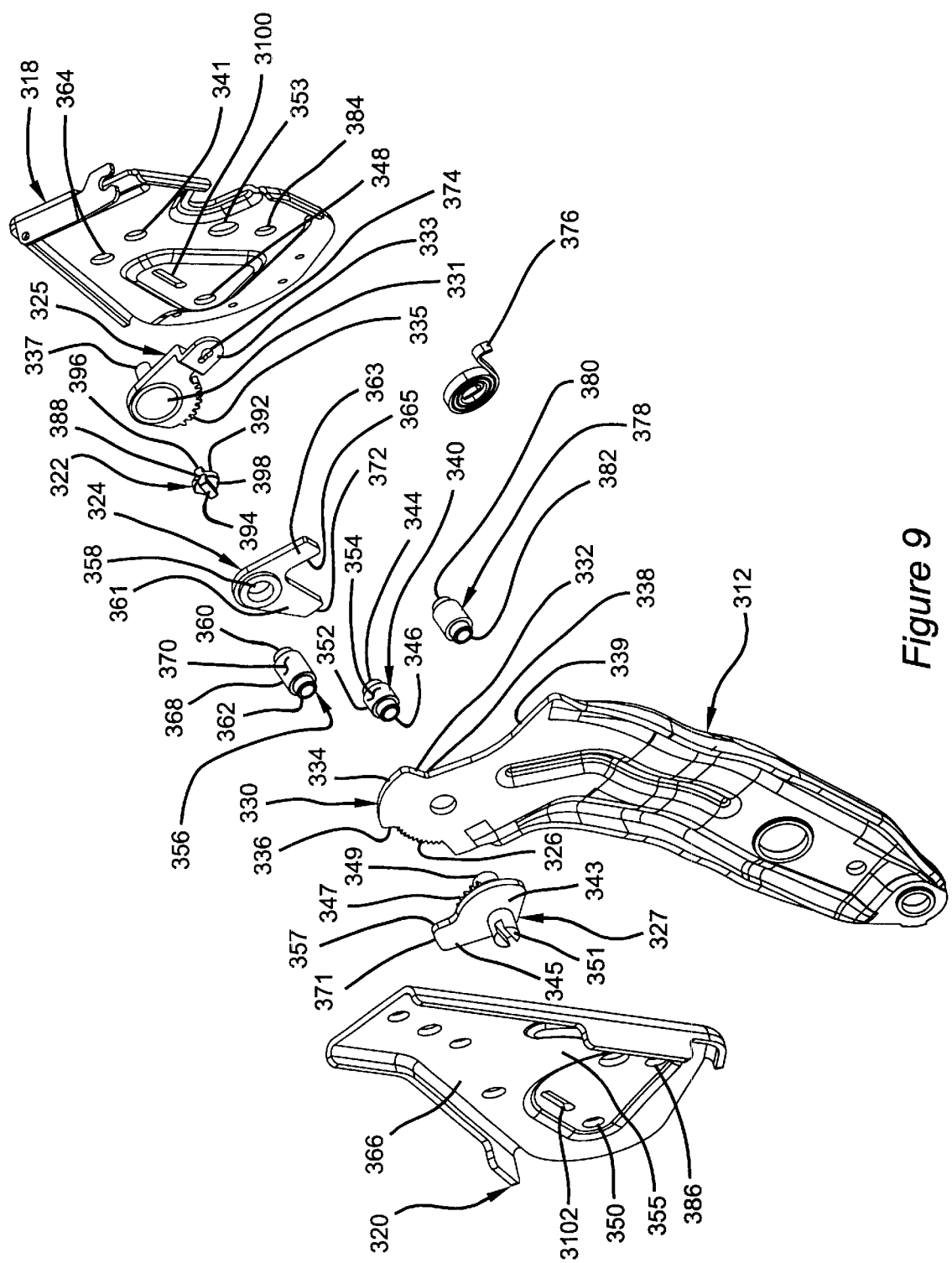
FIG. 9 is an exploded view of a third embodiment of the adjustment mechanism of the present invention.

With reference to FIGS. 8 and 9, a third preferred embodiment of the present invention is indicated as adjustment mechanism 310. The adjustment mechanism 310 generally includes an arm 312 disposed between and pivotally mounted to a quadrant 314 including inner and outer plates 318, 320. The quadrant 314 is selectively locked relative to the arm 312 by a locking member 322 that is selectively engaged by a cam plate 324. The cam plate 324 is actuated through a gear assembly 323.

A first end of the arm 312 includes a portion 316 having a plurality of pawl teeth 326. A second end of arm 312 includes an aperture 328 for connecting to a linear recliner mechanism and an aperture 397 is included for providing a pivot axis for the adjustment mechanism 310 (see FIGS. 8 and 9). The first end of the arm 312 further includes a shoulder 330 having a first side surface 332, a top surface 334, and a second side surface 336. The first side surface 332 forms a corner 338 of the arm 312 at a junction with a top surface 339.

The arm 312 is disposed between and rotatably supports the inner and outer plates 318,320 on a first pivot 340. The first pivot 340 is received through an aperture 342 of the arm 312. The first pivot 340 includes first and second cylindrical extensions 344,346 that are receivable into and supported by first and second apertures 348,350, respectively. The first pivot 340 further includes a support bearing 352 that extends radially and is disposed between the first and second cylindrical extensions 344,346. The support bearing 352 includes a bearing surface 354 which is received into the aperture 342 for rotatably supporting the quadrant 314 relative to the arm 312.

The gear assembly includes the cam plate 324 rotatably supported between the inner and outer plates 318,320, and first and second gear plates 325,327, each rotatably supported between the inner and outer plates 318,320. The cam plate 324 is rotatably supported by a second pivot 356 received through a central aperture 358 of the cam plate 324. The second pivot 356 includes first and second cylindrical extensions 360,362 that are receivable into and supported by first and second apertures 364,366, respectively. The second pivot 356 also includes a support bearing 368 that extends radially and is disposed between the first and second cylindrical extensions 360,362. The support bearing 368 includes a bearing surface 370 which is received into the aperture 358 for rotatably supporting the cam plate 324.

The first gear plate 325 includes a central portion 331 and an actuation arm 333 and a cable release aperture 374 for interconnection with a cable (not shown). The first gear plate 325 further includes a series of teeth 335 radially extending from the central portion 331 for meshed engagement with the second gear plate 327 as will be discussed further below. The central portion 331 further includes a cylindrical post 337 formed therein for rotatable attachment to the inner plate 320 of the quadrant 314. The cylindrical post 337 includes a bearing surface and is received through an aperture 341 formed in the inner plate 318. While the present invention includes a cylindrical post 337 that is formed within the first gear plate 325 it is anticipated that the cylindrical post 337 could be a separate member attached to the first gear plate 325 by suitable means and should be considered within the scope of the present invention.

The second gear plate 327 includes a central portion 343 and a reaction arm 345 having an engagement face 371. The central portion 343 includes a series of teeth 347 radially extending therefrom for meshed engagement with the first gear plate 325, as will be discussed further below. The central portion 343 further includes first and second cylindrical posts 349,351 formed therein for rotatable attachment to the inner and outer plates 318,320 of the quadrant 314. A first end of a coil spring 376 attaches to the second cylindrical post 351 and an aperture 375 of the outer plate 320 for anchoring a second end of the spring 376. The spring 376 rotationally biases the second gear plate 327 in a first rotational direction to bias a cam surface 372 toward the locking member 322, which, in turn, is forced toward the corner 338 and against the first side surface 332 of the arm 312. In this position, the quadrant 314 is held in a first upright position relative to the arm 312. The first and second cylindrical posts 349,351 include bearing surfaces and are received through apertures 353,355 formed in the inner and outer plates 318,320. While the present invention includes cylindrical posts 349,351 that are formed within the second gear plate 327 it is anticipated that the cylindrical posts 349,351 could be separate members attached to the second gear plate 327 by suitable means and should be considered within the scope of the present invention. The reaction arm 345 includes an engagement face 357 for interaction with the cam plate 324 during actuation of the adjustment mechanism 310.

The cam plate 324 includes an attachment aperture 358 formed therethrough, a first arm 361 having a cam surface 372 and a second arm 363 having an engagement face 365 for interaction with the second gear plate 327 during actuation of the adjustment mechanism 310. A cross member 378 includes cylindrical extensions 380,382 received into apertures 384,386, respectively, of the inner and outer plates 318,320. The cross member 378 contacts a face 339 of the arm 312 for prohibiting reward rotation of the quadrant 314 relative to the arm 312.

The locking member 322 is a wedge-shaped member having an arcuate surface 388 at a wide end for engaging the cam surface 372 of the cam plate 324 and a notch 390 disposed in a narrow end. The notch 390 is adapted to engage the pawl teeth 326 of the arm 312 for locking the quadrant 314 relative the arm 312. Ribs 392,394 extend perpendicularly from faces 396,398 of the locking member 322. The ribs 392,394 are slidably supported within slots 3100,3102 of the inner and outer plates 318,320, respectively, enabling the locking member 322 to slide therebetween. The locking member 322 slides in the slots 3100,3102 as it interfaces between the arm 312 and the cam plate 324. The cam plate 324 acts on the arcuate surface 388 to bias the locking member 322 against the arm 312.

With continued reference to FIGS. 8 and 9, operation of the adjustment mechanism 310 will be described in detail. In the first preferred embodiment, the adjustment mechanism 310 enables the quadrant 314 to pivot forward, relative to the arm 312, and lock in a plurality of forwardly inclined positions. To fold the quadrant 314 forward, a force is applied to the actuation arm 333 of the first gear plate 325. The applied force causes the first gear plate 325 to rotate, which subsequently rotates the second gear plate 327 against the bias of the spring 376. Rotation of the second gear plate 327 releases the engagement face 371 of the reaction arm 345 from the first arm 361 of the cam plate 324. Further rotation of the second gear plate 327 causes the reaction arm 345 to react against the second arm 363 of the cam plate 324. Engagement of the second gear plate 327 and the second arm 363 of the cam plate 324 causes the cam plate 324 to rotate, forcing the cam surface 372 to slide along and disengage the arcuate surface 388 of the locking member 322. Thus, the ribs 392,394 of the locking member 322 are free to slide in the slots 3100,3102 of the inner and outer housing plates 318,320 as the locking member 322 moves from a recessed position adjacent to the first side surface 332 to a raised position on the top surface 338 of the shoulder 330. More specifically, as the cam plate 324 rotates, the locking member 322 is pinched between the first side surface 332 of arm 312 and the slots 3100,3102. As the cam surface 372 is moved out of blocking engagement with the locking member 322, upward movement of locking member 322 is unrestricted. As the quadrant 314 is rotated, the walls defining the slots 3100,3102 of the inner and outer housing plates 318,320 push the locking member 322 upward within slots 3100,3102 until the locking member 322 slides over onto the top surface 338. Continued forward rotation of the quadrant 314 causes the locking member 322 to slide along the top surface 338, as best seen in FIG. 8. Once the locking member 322 is on the top surface 338, the first gear plate 325 may be released, wherein the spring 376 again biases the second gear plate 327 in the first rotational direction, inducing the first gear plate 325 to rotate and also releasing the cam plate 324 for engagement with the locking member 322. The cam surface 372 again biases the locking member 322 within the slots 3100,3102 pushing the locking member 322 against the top surface 338.

Once the quadrant 314 has rotated sufficiently forward, the locking member 322 slides off of the top surface 338 and onto the pawl teeth portion 316. Due to the force from the cam plate 324, the locking member 322 immediately engages the first pawl tooth 326, wherein the quadrant 314 is held in a first forward inclined position relative to the arm 312.

A plurality of alternative forward lock positions may be achieved by again operating the first gear plate 325 to disengage the arcuate surface 388 of the locking member 322. Once disengaged, the locking member 322 is movable across the pawl teeth portion 316 until a desired position has been achieved. Upon achieving a desired position, the first gear plate 325 is released, again biasing the locking member 322 into engagement with a particular tooth 326 of the pawl teeth portion 316.

To return the quadrant 314 to an upright position, relative to the arm 312, the first gear plate 325 is again rotated, thereby causing the second gear plate 327 to rotate against the biasing force of spring 376 causing the cam plate 324 to rotate such that the cam plate 324 disengages from the locking member 322. As the quadrant 314 rotates rearwardly, the locking member 322 moves from a recessed position adjacent to the second side surface 336 to a raised position on the top surface 338 of the shoulder 330. Specifically, the locking member 322 is pinched between the second side surface 336 of the arm 312 and the slots 3100,3102 until the locking member 322 slides onto the top surface 338 of the arm 312. Once the locking member 322 is on the top surface 338, the first gear plate 325 may be released, wherein the spring 376 again biases the second gear plate 327 in the first rotational direction allowing the first gear plate 325 to rotate and also causing the cam plate 324 to be released. Thus, the cam surface 372 biases the locking member 322 within the slots 3100, 3102 to force the locking member 322 against the top surface 338. After the quadrant 314 is rotated sufficiently rearward, the bias of the cam plate 324 causes the locking member 322 to slide within slots 3100, 3102, toward the corner 338 and against first side surface 332, thereby locking the quadrant 314 in an upright position.

The gear assembly 323 improves the operation of the adjustment mechanism 310 be effectively reducing the force required disengage the cam plate 124 from the locking member 322. Further, the gear assembly 323 prevents any jerking or jolting motion upon disengagement of the locking member 322 from the first side surface 332 of the arm 312 by actuating the cam 324 through the movement of the first and second gear plates 325,327 as opposed to applying a force directly to the cam itself 324.

Figure 10:
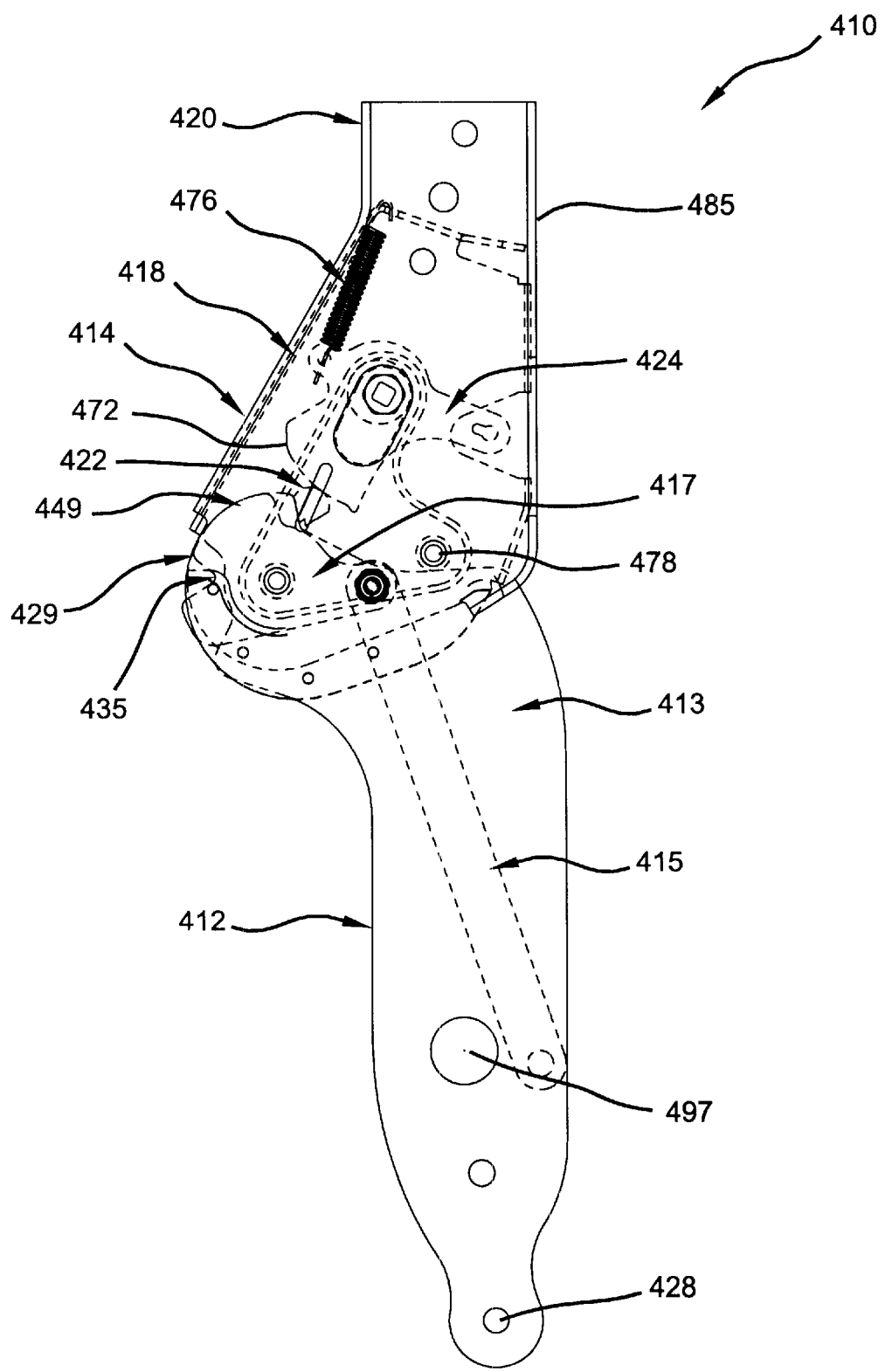
FIG. 10 is a side view of a fourth embodiment of the adjustment mechanism of the present invention.
Figure 11:
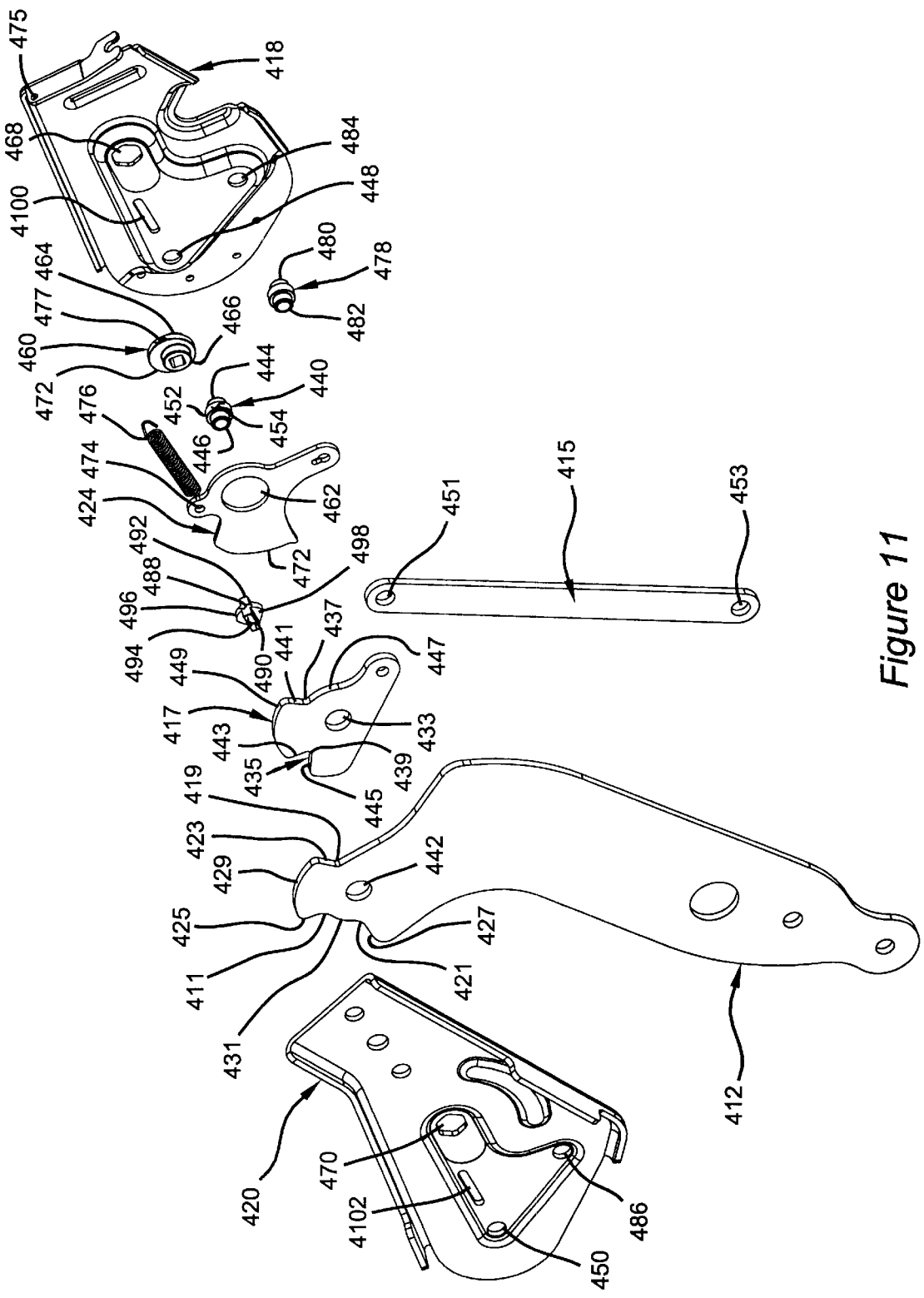
FIG. 11 is an exploded view of a fourth embodiment of the adjustment mechanism of the present invention.

With reference to FIGS. 10 and 11, a fourth preferred embodiment of the present invention is indicated as adjustment mechanism 410. The adjustment mechanism 410 generally includes an arm assembly 413 disposed between and pivotally mounted to a quadrant 414 including inner and outer plates 418,420. The quadrant 414 is selectively locked relative to the arm assembly by a locking member 422 that is selectively engaged by a cam plate 424.

The arm assembly 413 includes an arm 412, a link 415 and a sector plate 417. A first end of the arm 412 includes a first corner 419, a second corner 411, a third corner 421, a first side surface 423, a second side surface 425, a third side surface 427, a top surface 429, and an arcuate surface 431. The first side surface 423, second side surface 425 and top surface 429 form a locking shoulder. The first corner 419 is formed at the base of the first side surface 423 opposite the top surface 429. The second corner 419 is formed at the intersection of the second side surface 425 and the arcuate surface 431. The arcuate surface 431 is formed between the second corner 411 and the third corner 421. The third corner 423 is formed at the intersection of the third side 427 and the arcuate surface 431. A second end of the arm 412 includes a first aperture 497 for providing a pivot axis and a second aperture 428 for connecting to a linear recliner mechanism.

The arm 412 is disposed between and rotatably supports the inner and outer plates 418,420 on a first pivot 440. The first pivot 440 is received through an aperture 442 of the arm 412. The first pivot 440 includes first and second cylindrical extensions 444,446 that are receivable into and supported by first and second apertures 448,450, respectively. The first pivot 440 further includes a support bearing 452 that extends radially and is disposed between the first and second cylindrical extensions 444,446. The support bearing 452 includes a bearing surface 454 that is received into the aperture 442 for rotatably supporting the quadrant 414 relative to the arm 412. The sector plate 417 is also rotatably supported by the first pivot 440 and is disposed between the arm 412 and the inner plate 418.

The sector plate 417 includes an aperture 433, a locking member recess 435, a first corner 437, a second corner 439, a first side 441, a second side 443, a third side 445, an arcuate surface 447 and a top surface 449. The first corner 437 is formed at the intersection of the arcuate surface 447 and the first side 441. The second corner 439 is formed at the base of the locking member recess 435 by the intersection of the second side 443 and the third side 445. The first side 441, second side 443 and top surface 449 form a locking shoulder. The first pivot 440 is received through the aperture 433 for rotatably supporting the sector plate 417. An aperture is formed at an opposite end of the sector plate 417 from the locking member recess 435 for attachment of the link 415 thereto. The link 415 includes a first end and a second end with apertures 451,453 formed therethrough. The first end of the link 415 is rotatably attached to the sector plate 417 and the second end of the link 417 is rotatably attached to a fixed external structure (not shown).

The cam plate 422 is disposed between the inner and outer housing plates 418,420 and is rotatably supported therebetween by a second pivot 460 received through a central aperture 462 of the cam plate 422. The second pivot 460 includes first and second cylindrical extensions 464,466 that are received into and supported by apertures 468,470 in the inner and outer plates 418,420, respectively. The second pivot 460 also includes a radially extending support bearing 472 that includes a bearing surface 477. The second pivot 460 is received through the aperture 462 of the arm 412, whereby the second pivot 460 rotatably supports the quadrant 414 about the bearing surface 477.

One end of the cam plate 424 includes a cam surface 472. A second end of the cam plate 424 includes an aperture 474 for anchoring a first end of a spring 476 and the inner plate 418 includes an aperture 475 for anchoring a second end of the spring 476. The spring 476 rotationally biases the cam plate 424 in a first rotational direction, which biases the cam surface 472 toward the locking member 422, which, in turn, is forced toward the corner and against the first side surface of the arm 412. In this position, the quadrant 414 is held in a first upright position relative to the arm 412. A cross member 478 includes cylindrical extensions 480,482 received into apertures 484,486, respectively, of the inner and outer plates 418,420. The cross member 478 contacts a face of the arm 412 for prohibiting reward rotation of the quadrant 414 relative to the arm 412.

The locking member 422 is a wedge-shaped member having an arcuate surface 488 at a wide end for engaging the cam surface 472 of the cam plate 424 and a peak 490 disposed in a narrow end. The peak 490 is adapted to engage the locking member recess of the sector plate for locking the quadrant 414 relative to the arm 412. Ribs 492,494 extend perpendicularly from faces 496,498 of the locking member 422. The ribs 492,494 are slidably supported within slots 4100,4102 of the inner and outer plates 418,420, respectively, enabling the locking member 422 to slide therebetween. The locking member 422 slides in the slots 4100,4102 as it interfaces between the arm assembly and the cam plate 424. The cam plate 424 acts on the arcuate surface 488 to bias the locking member 422 against the arm 412.

Figure 12:
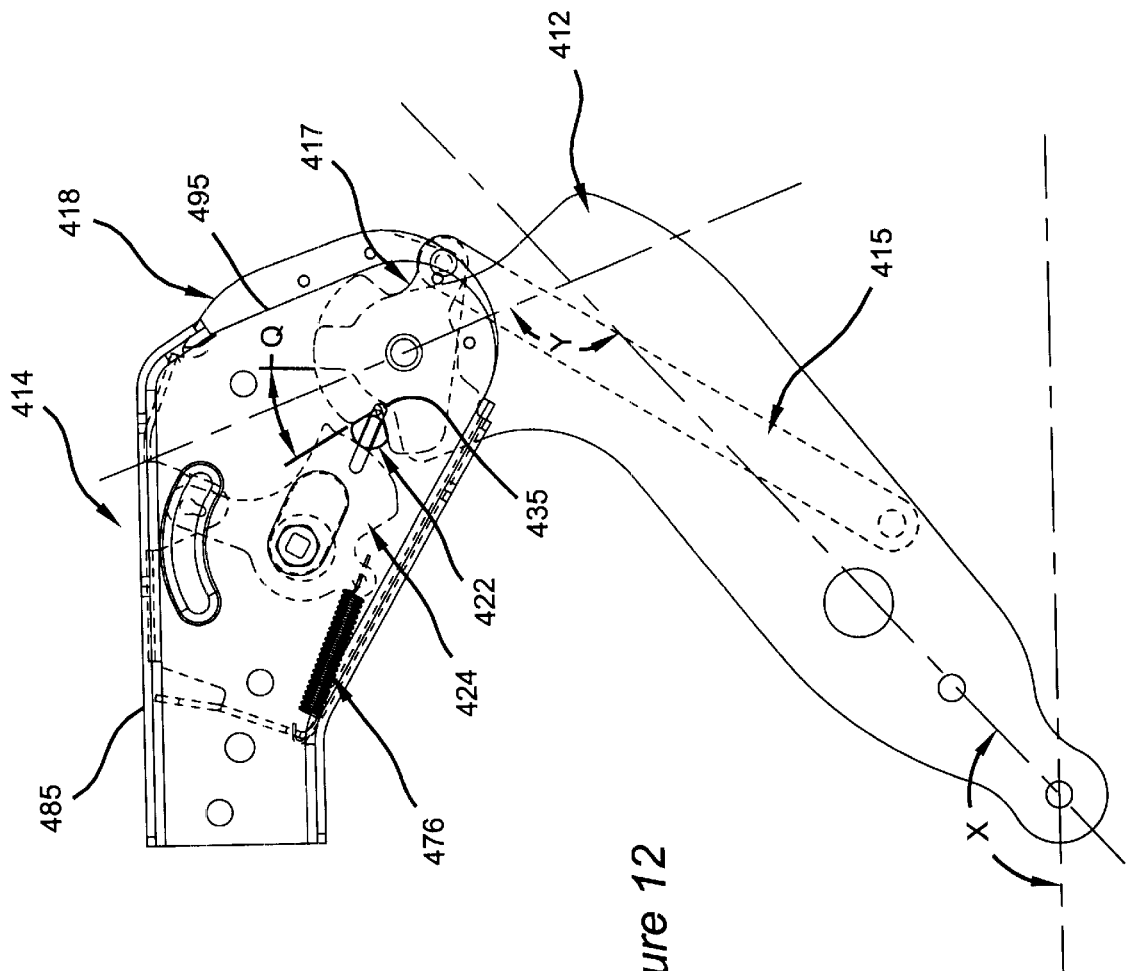
FIG. 12 is a side view of a third embodiment of the adjustment mechanism of the present invention in a first position.
Figure 13:
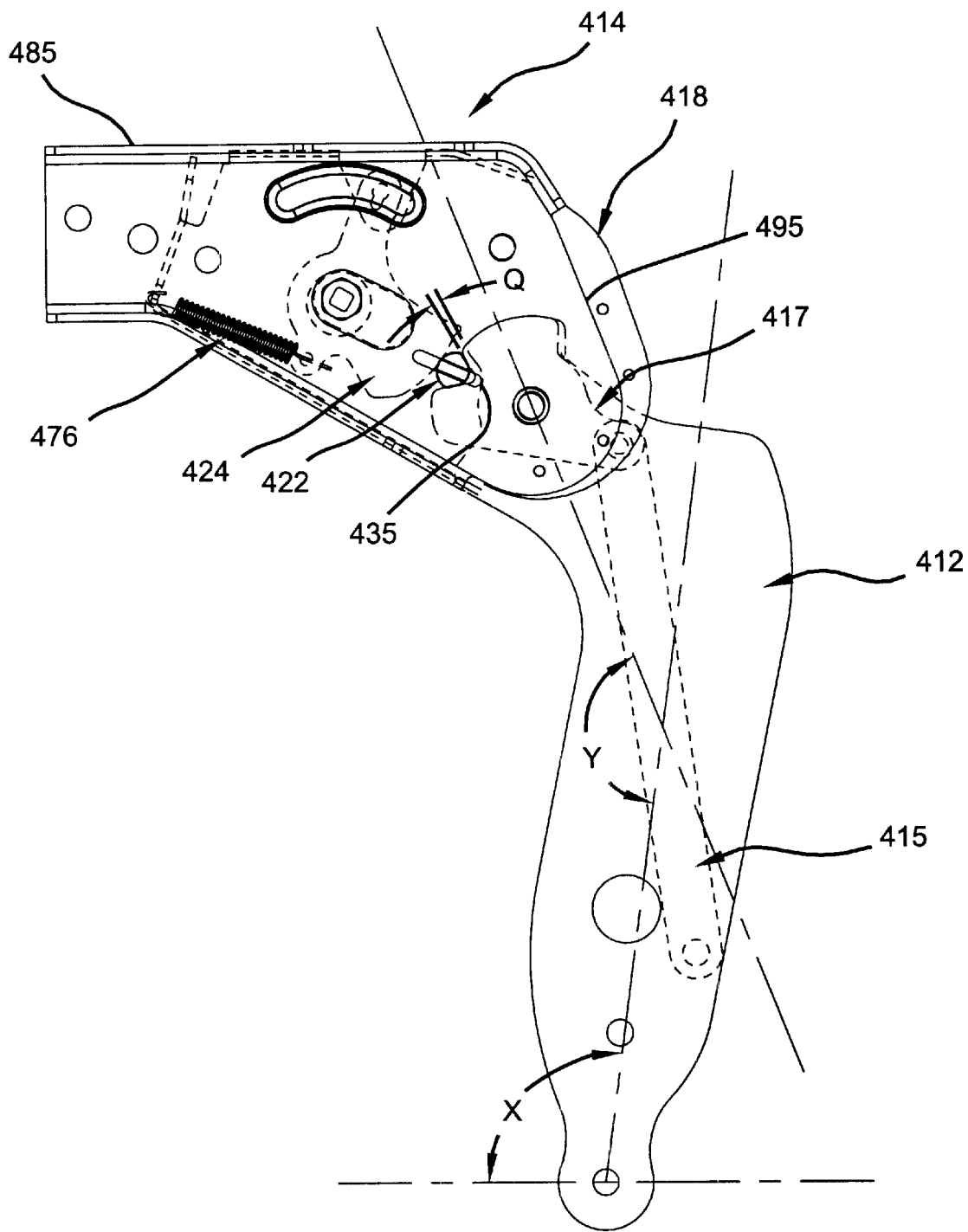
FIG. 13 is a side view of a third embodiment of the adjustment mechanism of the present invention in a second position.

With further reference to FIGS. 12 and 13, operation of the adjustment mechanism 410 will be described in detail. In a fourth preferred embodiment, the adjustment mechanism 410 enables the quadrant 414 to pivot forward, relative to the arm 412, and lock in a horizontal or fold-flat position. To fold the quadrant 414 forward, the cam plate 424 is rotated against the biasing force of the spring 476, forcing the cam surface 472 to slide along and disengage the arcuate surface 488 of the locking member 422. Thus, the ribs 492,494 of the locking member 422 are free to slide in the slots 4100,4102 of the inner and outer housing plates 418,420 as the locking member 422 moves from a recessed position adjacent to the first side surface 423 to a raised position on the top surface 429 of the arm 412. Specifically, as the cam plate 424 rotates against the bias of the spring 476, the locking member 422 is pinched between the first side surface 423 of the arm 412 and the slots 4100,4102. As the cam surface 472 is moved out of blocking engagement with the locking member 422, upward movement of locking member 422 is unrestricted. As the quadrant 414 is rotated, the walls defining the slots 4100,4102 of the inner and outer housing plates 418,420 push the locking member 422 upward within slots 4100,4102 until the locking member 422 slides over onto the top surface 429 of the arm 412. Continued forward rotation of the quadrant 414 causes the locking member 422 to slide along the top surface 429 of the arm 412 and eventually transfer from the top surface 429 of the arm 412 to the top surface 449 of the sector plate 417. Once the locking member 422 is on the top surface 429,449 of either the arm 412 or the sector plate 417, the cam plate 424 may be released wherein the spring 476 again biases the cam plate 424 in the first rotational direction. The cam surface 472 again biases the locking member 422 within the slots 4100,4102 pushing the locking member 422 against the top surface 429,449 of either the arm 412 or the sector plate 417, or both, depending upon the forward position of the quadrant 414 at the time the cam plate 424 is released.

Once the quadrant 414 has rotated sufficiently forward, the locking member 422 slides off of the top surface 449 of the sector plate 417 and into the locking member recess 435. Due to the bias of the cam plate 424, the locking member 422 immediately engages the locking member recess 435, wherein the back surface 485 of the quadrant 414 is held in a relatively horizontal or fold-flat position.

The point on the sector plate 417 where the locking member 422 transfers from the top surface 429 of the arm 412 to the top surface 449 of the sector plate 417 is governed by the relative initial relationship between the arm 412 and the quadrant 414. As best shown in FIG. 12, the relative angle X of the arm to a horizontal surface determines the angle Y between the arm 412 and the quadrant 414, and subsequently the distance the locking member 422 must travel over the sector plate 417 before reaching the locking member recess 435. Specifically, when the arm 412 is rotated (due to reclining), the link 415 rotates the sector plate 417 such that the orientation of the locking member 422, relative to the horizontal surface remains constant for enabling the back surface 485 of the quadrant 414 to remain horizontal. However, the relative position of the link 415 to the arm 412 changes and the relative position of the sector plate 417 to both the arm 412 and quadrant 414 also changes as the arm 412 is rotated. For example, as the initial angle Y between the arm 412 and the bottom surface 495 of the quadrant 414 increases, the distance between the second side 423 of the arm 412 and the second side 443 of the sector plate 417 decreases as indicated in FIGS. 12 and 13 as Q. Thus, the greater the initial angle Y (or lower the angle X) between the arm 412 and the bottom surface 495 of the quadrant 414, the shorter the distance the locking member 422 must travel over the top surface 449 of the sector plate 417 to reach the locking member recess 435. The relative rotation of the sector plate 417 and the arm 412, through the connection of the link 415, allows the relative position of the sector plate 417 to the quadrant 414 to change for correspondingly maintaining the back surface 485 of the quadrant 414 in a relatively horizontal position.

To return the quadrant 414 to an upright position, relative to the arm 412, the cam plate 424 is again rotated against the biasing force of spring 476 to disengage the cam plate 424 from the locking member 422. As the quadrant 414 rotates rearwardly, the locking member 422 moves from a recessed position in the locking member recess 435 to a raised position on the top surface 449 of the sector plate 417. Specifically, the locking member 422 is engaged in the locking member recess 435 and the slots 4100,4102 until the locking member 422 slides onto the top surface 449 of the sector plate 417. Once the locking member 422 is on the top surface 449,429 of either the sector plate 417 or the arm 412, the cam plate 424 may be released wherein the spring 476 again biases the cam plate 424 in the first rotational direction. Thus, the cam surface 472 biases the locking member 422 within the slots 4100,4102 to force the locking member 422 against the top surface 449,429 of either the sector plate 417 or the arm 412. After the quadrant 414 is rotated sufficiently rearward, the locking member 422 transfers from the top surface 449 of the sector plate 417 to the top surface 429 of the arm 412. The relative distance the locking member 422 must travel Q before transferring from the top surface 449 of the sector plate 417 to the top surface 429 of the arm 412 depends on the initial angle Y between the arm 412 and the quadrant 414 as previously discussed. After the quadrant 414 is rotated sufficiently rearward, the bias of the cam plate 424 causes the locking member 422 to slide within slots 4100,4102, toward the first corner 419 of the arm 412 and against first side surface 423, thereby locking the quadrant 414 in an upright position.

Figure 14:
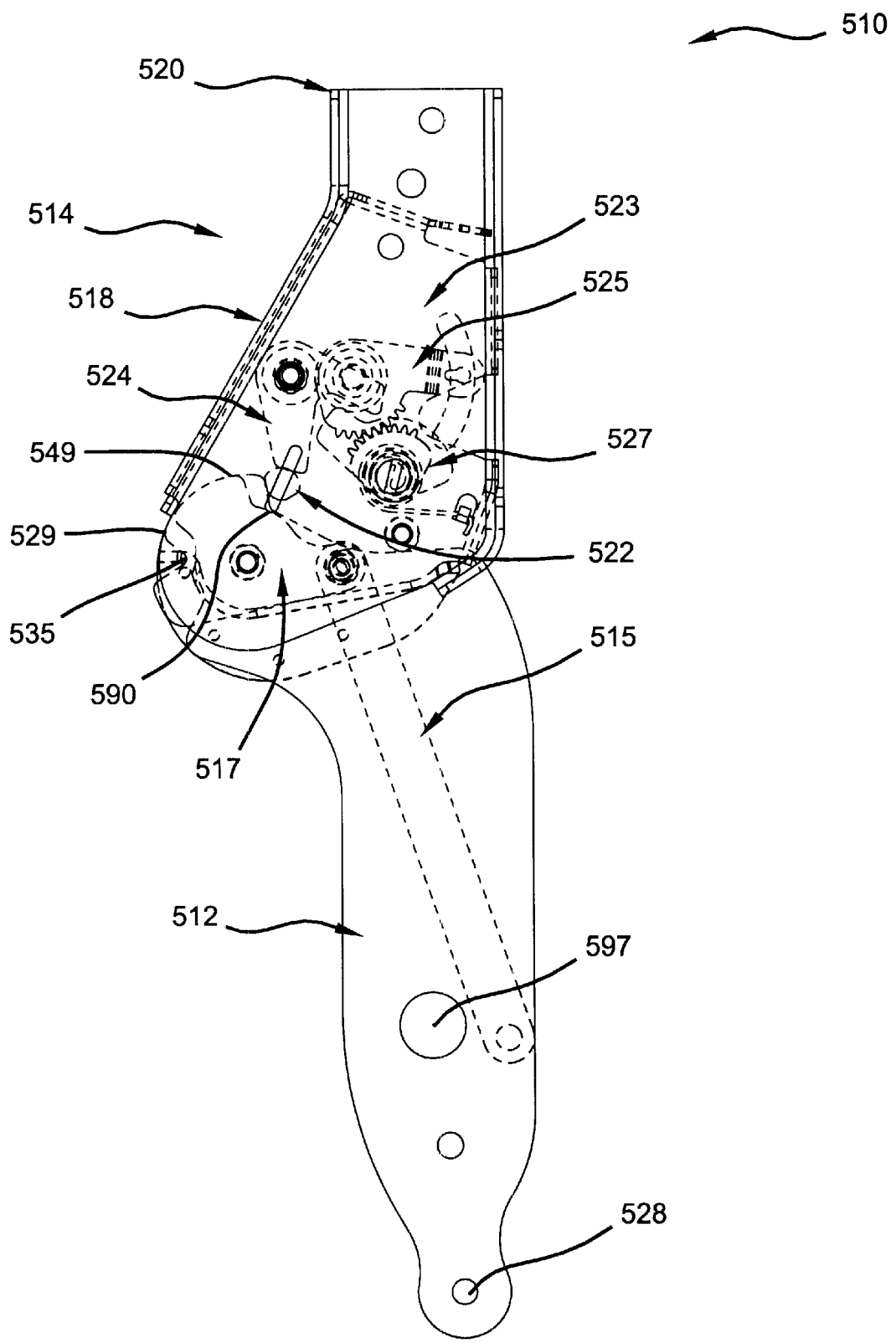
FIG. 14 is a side view of a fifth embodiment of the adjustment mechanism of the present invention.
Figure 15:
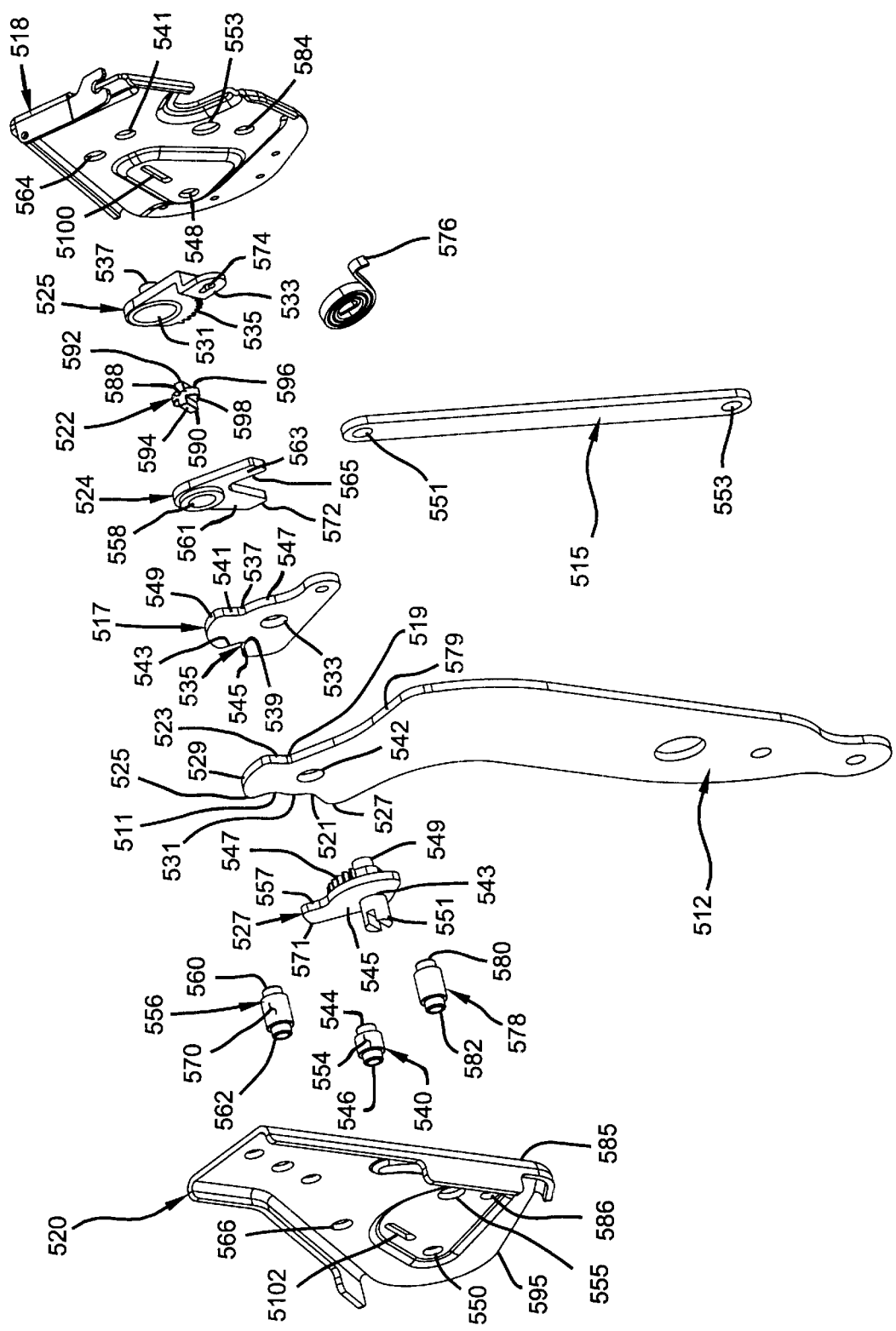
FIG. 15 is an exploded view of a fifth embodiment of the adjustment mechanism of the present invention.

With particular reference to FIGS. 14 and 15, a fifth preferred embodiment of the present invention is indicated as adjustment mechanism 510. The adjustment mechanism 510 generally includes an arm assembly 513 disposed between and pivotally mounted to a quadrant 514 including inner and outer plates 518,520. The quadrant 514 is selectively locked relative to the arm assembly 513 by a locking member 522 that is selectively engaged by a cam plate 522 that is actuated through a gear assembly 523.

The gear assembly 523 includes the cam plate 524 rotatably supported between the inner and outer plates 518,520, and first and second gear plates 525,527 each rotatably supported between the inner and outer plates 518,520. The cam plate 524 is rotatably supported by a second pivot 556 received through a central aperture 558 of the cam plate 524. The second pivot 556 includes first and second cylindrical extensions 560,562 that are receivable into and supported by first and second apertures 564,566, respectively. The second pivot 556 also includes a support bearing 568 that extends radially and is disposed between the first and second cylindrical extensions 560,562. The support bearing 568 includes a bearing surface 570 that is received into the aperture 558 for rotatably supporting the cam plate 524.

The first gear plate 525 includes a central portion 531 and an actuation arm 533 and a cable release aperture 574 for interconnection with a cable (not shown). The first gear plate 525 further includes a series of teeth 535 radially extending from the central portion 531 for meshed engagement with the second gear plate 527 as will be discussed further below. The central portion 531 further includes a cylindrical post 537 formed therein for rotatable attachment to the inner plate 520 of the quadrant 514. The cylindrical post 537 includes a bearing surface and is received through an aperture 541 formed in the inner plate 318. While the present invention includes a cylindrical post 537 that is formed within the first gear plate 525 it is anticipated that the cylindrical post 537 could be a separate member attached to the first gear plate 525 by suitable means and should be considered within the scope of the present invention.

The second gear plate 527 includes a central portion 543 and a reaction arm 545 having an engagement face 571. The central portion 543 includes a series of teeth 547 radially extending therefrom for meshed engagement with the first gear plate 525 as will be discussed further below. The central portion 543 further includes first and second cylindrical posts 549,551 formed therein for rotatable attachment to the inner and outer plates 518,520 of the quadrant 514. A first end of a coil spring 576 attaches to the second cylindrical post 551 and the outer plate 520 includes an aperture 575 for anchoring a second end of the spring 576. The spring 576 rotationally biases the second gear plate 527 in a first rotational direction, which in turn rotates the first gear plate 525 in a second rotational direction thereby biasing a cam surface 572 toward the locking member 522, which, in turn, is forced toward a corner 538 and against a first side surface 532 of the arm 512. In this position, the quadrant 514 is held in a first upright position relative to the arm 512. The first and second cylindrical posts 549,551 include bearing surfaces and are received through apertures 553,555 formed in the inner and outer plates 518,520. While the present invention includes cylindrical posts 549,551 that are formed within the second gear plate 527 it is anticipated that the cylindrical posts 549,551 could be separate members attached to the second gear plate 527 by suitable means and should be considered within the scope of the present invention. The reaction arm 545 includes an engagement face 557 for interaction with the cam plate 524 during actuation of the adjustment mechanism 510.

The cam plate 524 includes an attachment aperture 558 formed therethrough, a first arm 561 having a cam surface 572 and a second arm 563 having an engagement face 565 for interaction with the second gear plate 527 during actuation of the adjustment mechanism 510. A cross member 578 includes cylindrical extensions 580,582 received into apertures 584,586, respectively, of the inner and outer plates 518,520. The cross member 578 contacts a face 579 of the arm 512 for prohibiting reward rotation of the quadrant 514 relative to the arm 512.

The locking member 522 is a wedge-shaped member having a arcuate surface 588 at a wide end for engaging the cam surface 572 of the cam plate 524 and a peak 590 disposed in a narrow end. The peak 590 is adapted to engage the locking member recess for locking the quadrant 514 relative the arm 3512. Ribs 592,594 extend perpendicularly from faces 596,598 of the locking member 522. The ribs 592,594 are slidably supported within slots 5100,5102 of the inner and outer plates 518,520, respectively, enabling the locking member 522 to slide therebetween. The locking member 522 slides in the slots 5100,5102 as it interfaces between the arm 512 and the cam plate 524. The cam plate 524 acts on the arcuate surface 588 to bias the locking member 522 against the arm 512 and the sector plate 517.

The arm assembly 513 includes an arm 512, a link 515 and a sector plate 517. A first end of the arm includes a first corner 519, a second corner 511, a third corner 521, a first side surface 523, a second side surface 525, a third side surface 427, a top surface 429, and an arcuate surface 431. The first side surface 523, second side surface 525 and top surface 529 form a locking shoulder. The first corner 519 is formed at the base of the first side 523 opposite the top surface 529. The second corner 511 is formed at the intersection of the second side surface 525 and the arcuate surface 531. The arcuate surface 531 is formed between the second corner 511 and the third corner 521. The third corner 523 is formed at the intersection of the third side 527 and the arcuate surface 531. A second end of the arm 512 includes a first aperture 597 for providing a pivot axis and a second aperture 528 for connecting to a linear recliner mechanism.

The arm 512 is disposed between and rotatably supports the inner and outer plates 518,520 on a first pivot 540. The first pivot 540 is received through an aperture 542 of the arm 512. The first pivot 540 includes first and second cylindrical extensions 544,546 that are receivable into and supported by first and second apertures 548,550, respectively. The first pivot 540 further includes a support bearing 552 that extends radially and is disposed between the first and second cylindrical extensions 544,546. The support bearing 552 includes a bearing surface 554 that is received into the aperture 542 for rotatably supporting the quadrant 514 relative to the arm 512. The sector plate is also rotatably supported by the first pivot 540 and is disposed between the arm 512 and the inner plate 518.

The sector plate 517 includes an aperture 533, a locking member recess 535, a first corner 537, a second corner 539, a first side 541, a second side 543, a third side 545, an arcuate surface 547 and a top surface 549. The first side 541, second side 543 and top surface 549 form a locking shoulder. The first corner 537 is formed at the intersection of the arcuate surface 547 and the first side 541. The second corner 539 is formed at the base of the locking member recess 535 by the intersection of the second side 543 and the third side 545. The first pivot 540 is received through the aperture 533 for rotatably supporting the sector plate 517. An aperture is formed at an opposite end of the sector plate 517 from the locking member recess 535 for attachment of the link 515 thereto. The link 515 includes a first end and a second end with apertures 551,553 formed therethrough. The first end of the link 515 is rotatably attached to the sector plate 517 and the second end of the link 517 is rotatably attached to a fixed external structure (not shown).

With particular reference to FIGS. 14 and 15, operation of the adjustment mechanism 510 will be described in detail. In a fifth preferred embodiment, the adjustment mechanism 510 enables the quadrant 514 to pivot forward relative to the arm 512 and lock in a horizontal or fold-flat position. To fold the quadrant 514 forward, a force is applied to the actuation arm 533 of the first gear plate 525. The applied force causes the first gear plate 525 to rotate, which subsequently rotates the second gear plate 527 against the bias of the spring 576. Rotation of the second gear plate 527 releases the engagement face 571 of the reaction arm 545 from the first arm 561 of the cam plate 524. Further rotation of the second gear plate 527 causes the reaction arm 545 to react against the second arm 563 of the cam plate 524. Engagement of the second gear plate 527 and the second arm 563 of the cam plate 524 induces the cam plate 524 to rotate, forcing the cam surface 572 to disengage the arcuate surface 588 of the locking member 522. Thus, the ribs 592,594 of the locking member 522 are free to slide in the slots 5100,5102 of the inner and outer housing plates 518,520 as the locking member 522 moves from a recessed position adjacent to the first side surface 523 to a raised position on the top surface 529 of the arm 512.

Specifically, as the cam plate 524 rotates against the bias of the spring 576, the locking member 522 is pinched between the first side surface 523 of the arm 512 and the slots 5100,5102. As the cam surface 572 is moved out of blocking engagement with the locking member 522, upward movement of locking member 522 is unrestricted. As the quadrant 514 is rotated, the walls defining the slots 5100, 5102 of the inner and outer housing plates 518,520 push the locking member 522 upward within slots 5100,5102 until the locking member 522 slides over onto the top surface 529 of the arm 512. Continued forward rotation of the quadrant 514 causes the locking member 522 to slide along the top surface 529 of the arm 512 and eventually transfer from the top surface 529 of the arm 512 to the top surface 549 of the sector plate 517, a portion thereof overlapping. Once the locking member 522 is on the top surface 529,549 of either the arm 512 or the sector plate 517, the first gear plate 525 may be released, wherein the spring 576 again biases the second gear plate 527 in the first rotational direction, allowing the first gear plate 525 to rotate and also causing the cam plate 524 to be released. The cam surface 572 again biases the locking member 522 within the slots 5100,5102, pushing the locking member 522 against the top surface 529,549 of either the arm 512 or the sector plate 517 or both, depending on the forward movement of the quadrant 514 at the time the first gear plate 525 is released.

Once the quadrant 514 has rotated sufficiently forward, the locking member 522 slides off of the top surface 549 of the sector plate 517 and into the locking member recess 535. Due to the force of the cam plate 524, the locking member 522 immediately engages the locking member recess 535, wherein the back surface 585 of the quadrant 514 is held in a relatively horizontal or fold-flat position.

The point on the sector plate 517 where the locking member 522 transfers from the top surface 529 of the arm 512 to the top surface 519 of the sector plate 517 is governed by the relative initial relationship between the arm 512 and the quadrant 514. The relative angle X (reference FIGS. 12 and 13) of the arm 512 to a horizontal surface determines the angle Y (reference FIGS. 12 and 13) between the arm 512 and the quadrant 514, and subsequently the distance Q (reference FIGS. 12 and 13) the locking member 522 must travel over the sector plate 517 before reaching the locking member recess 535. When the arm 512 is rotated, the link 515 rotates the sector plate 517 such that the orientation of the locking member 522, relative to the horizontal surface remains constant for enabling the back surface 585 of the quadrant 514 to remain horizontal. However, the relative position of the link 515 to the arm 512 changes and, thus, the relative position of the sector plate 517 to the arm 512 also changes as the arm 512 is rotated. For example, as the initial angle Y between the arm 512 and the bottom surface 595 of the quadrant 514 increases between the second side 525 of the arm 512 and the second side 543 of the sector plate 517 decreases. Thus, the greater the initial angle Y between the arm 512 and the bottom surface 595 of the quadrant 514, the shorter the distance the locking member 522 must travel over the top surface 549 of the sector plate 517 to reach the locking member recess 535. The relative rotation of the sector plate 517 and the arm 512, through the connection of the link 515, allows the relative position of the sector plate 517 to the quadrant 514 to change for correspondingly maintaining the back surface 585 of the quadrant 514 in a relatively horizontal position.

To return the quadrant 514 to an upright position relative to the arm 512, the first gear plate 525 is again rotated, thereby causing the second gear plate 527 to rotate against the biasing force of spring 576 causing the cam plate 524 to rotate such that the cam plate 524 disengages from the locking member 522. As the quadrant 514 rotates rearwardly, the locking member 522 moves from a recessed position in the locking member recess 535 to a raised position on the top surface 549 of the sector plate 517. Specifically, the locking member 522 is engaged in the locking member recess 535 and the slots 5100,5102 until the locking member 522 slides onto the top surface 549 of the sector plate 517. Once the locking member 522 is on the top surface 549,529 of either the sector plate 549 or the arm 512, the first gear plate 525 may be released, wherein the spring 576 again biases the second gear plate 527 in the first rotational direction, allowing the first gear plate 525 to rotate, and also causing the cam plate 524 to rotate. Thus, the cam surface 572 again biases the locking member 522 within the slots 5100,5102 to force the locking member 522 against the top surface 549,529 of either the sector plate 517 or the arm 512.

After the quadrant 514 is rotated sufficiently rearward, the locking member 522 transfers from the top surface 549 of the sector plate 517 to the top surface 529 of the arm 512. The relative distance the locking member 522 must travel before transferring from the top surface 549 of the sector plate 517 to the top surface 549 of the arm 512 depends on the initial angle Y between the arm 512 and the quadrant 514 as previously discussed. After the quadrant 514 is rotated sufficiently rearward, the bias of the cam plate 524 causes the locking member 522 to slide within slots 5100,5102, toward the first corner 519 of the arm 512 and against first side surface 523, thereby locking the quadrant 514 in an upright position.

It will be understood that the third, fourth and fifth embodiments of the adjustment mechanism 310, 410, 510 may be adapted for use in a seat assembly, similarly as that described for seat assembly 200 of FIGS. 6a, 6b, 6c and 7. Therefore, a detailed description is foregone. In general, the recliner mechanism 310 enables an operator to more easily disengage the locking member 322, via a gear reduction through first and second gear plates 325,327, for folding the seat back 202 relative to the seat 204 in one of a number of fold-forward positions. The recliner mechanism 410 enables the seat back 202 to maintain a constant fold-forward, horizontal position, regardless of a recline position of the recliner mechanism 410 to the seat 204. The recliner mechanism 510, combines the features of the recliner mechanisms 310,410 for enabling easier disengagement of the locking member 522 and maintaining a constant fold-forward, horizontal position, regardless of a recline position of the recliner mechanism 510 to the seat 204.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A seat adjustment mechanism, comprising:
    an arm including a first locking shoulder;
    a sector plate rotatably supported by said arm and including a second locking shoulder having a lock recess;
    a quadrant rotatably supported by said arm;
    a cam plate rotatably supported by said quadrant; and
    a locking member slidably supported by said quadrant and selectively engaged by said cam plate for locking said quadrant in one of a first and second position relative to said arm, wherein said locking member is biased against said first locking shoulder in said first position and said locking member is biased into said lock recess in said second position.

2. The seat adjustment mechanism of claim 1, wherein said locking member engages each of said first and second said locking shoulders during rotation of said quadrant between said first and second positions.

3. The seat adjustment mechanism of claim 1, further comprising a biasing member biasing said cam plate toward engagement with said locking member.

4. The seat adjustment mechanism of claim 3, wherein said biasing member selectively locks said quadrant relative to said arm.

5. The seat adjustment mechanism of claim 3, wherein said biasing member is a spring.

6. The seat adjustment mechanism of claim 1, wherein said cam plate includes a cam surface selectively engaging said locking member to slidably bias said locking member into engagement with one of said arm and said sector plate.

7. The seat adjustment mechanism of claim 1, further comprising a link operably interconnecting said arm and said sector plate to enable a constant relative position between said sector plate and said quadrant.

8. The seat adjustment mechanism of claim 1, wherein said quadrant includes inner and outer housing plates.

9. The seat adjustment mechanism of claim 1, wherein said locking member is a wedge-shaped body including an arcuate surface at a wide end to engage said cam plate and a notch at a narrow end to engage one of said arm and said sector plate.

10. The seat adjustment mechanism of claim 1, further comprising a gear assembly rotatably supported by said quadrant for actuation of said cam plate.

11. The seat adjustment mechanism of claim 10, wherein said gear assembly includes a first gear plate and a second gear plate, said first gear plate rotatably supported by said quadrant, said second gear plate in meshed engagement with said first gear plate and selectively imparting rotation to said cam plate.

12. The seat adjustment mechanism of claim 10, further comprising a link operably interconnecting said arm and said sector plate to enable a constant relative position between said sector plate and said quadrant.

13. The seat adjustment mechanism of claim 10, wherein said cam plate includes a cam surface selectively engaging said locking member to slidably bias said locking member into engagement with one of said arm and said sector plate.

14. The seat adjustment mechanism of claim 10, wherein said quadrant includes inner and outer housing plates.

15. An adjustable seat assembly, comprising:
    a seat; and
    a recliner mechanism pivotally supporting a seat back relative to said seat, said recliner mechanism including:
        an arm including a first locking shoulder;
        a sector plate rotatably supported by said arm and including a second locking shoulder having a lock recess;
        a quadrant rotatably supported by said arm;
        a cam plate rotatably supported by said quadrant; and
        a locking member slidably supported by said quadrant and selectively engaged by said cam plate for locking said quadrant in one of a first and second position relative to said arm, wherein said locking member is biased against said first locking shoulder in said first position and said locking member is biased into said lock recess in said second position.

16. The adjustable seat assembly of claim 15, wherein said locking member engages each of said first and second said locking shoulders during rotation of said quadrant between said first and second positions.

17. The adjustable seat assembly of claim 15, wherein said recliner mechanism further includes a gear assembly rotatably supported by said quadrant for actuation of said cam plate.

18. The adjustable seat assembly of claim 17, wherein said gear assembly includes a first gear plate and a second gear plate, said first gear plate rotatably supported by said quadrant, said second gear plate in meshed engagement with said first gear plate and selectively imparting rotation to said cam plate.

19. The adjustable seat assembly of claim 15, further comprising a link operably interconnecting said arm and said sector plate to enable a constant relative position between said sector plate and said quadrant.

20. The adjustable seat assembly of claim 15, further comprising a biasing member for biasing said cam plate into engagement with said locking member.

21. The adjustable seat assembly of claim 20, wherein said biasing member selectively locks said quadrant relative to said arm.

22. The adjustable seat assembly of claim 20, wherein said biasing member is a spring.

23. The adjustable seat assembly of claim 15, wherein said cam plate includes a cam surface selectively engaging said locking member.

24. The adjustable seat assembly of claim 23, wherein said cam surface slidably biases said locking member into engagement with one of said arm and said sector plate.

* * * * *